(12) United States Patent
Higginson et al.

(10) Patent No.: US 8,325,411 B2
(45) Date of Patent: Dec. 4, 2012

(54) NEGATIVE REFRACTIVE INDEX MATERIALS AND METHODS FOR MAKING SAME

(75) Inventors: Keith A. Higginson, Leominster, MA (US); Alkim Akyurtlu, Arlington, MA (US); Adil-Gerai Kussow, Beverly, MA (US)

(73) Assignee: Triton Systems, Inc., Chelmsford, MA (US)

( * ) Notice: Subject to any disclaimer, the term of this patent is extended or adjusted under 35 U.S.C. 154(b) by 62 days.

(21) Appl. No.: 12/626,173

(22) Filed: Nov. 25, 2009

(65) Prior Publication Data

US 2010/0157437 A1    Jun. 24, 2010

Related U.S. Application Data

(60) Provisional application No. 61/118,123, filed on Nov. 26, 2008.

(51) Int. Cl.
*G02F 1/29* (2006.01)
(52) U.S. Cl. ....................................... 359/315
(58) Field of Classification Search .............. 359/642, 359/315; 977/932, 834
See application file for complete search history.

(56) References Cited

U.S. PATENT DOCUMENTS

| 7,494,688 B2* | 2/2009 | Venkataramani et al. ..... 505/434 |
| 2009/0034055 A1* | 2/2009 | Gibson ......................... 359/296 |
| 2009/0040131 A1* | 2/2009 | Mosallaei ................. 343/911 R |

OTHER PUBLICATIONS

Zhang, et al., Superlenses to overcome the diffraction limit, *Nature Materials* (Jun. 2008), 7:435-441.
Jacob, et al., Optical Hyperlens: Far-Field imaging beyond the diffraction limit, *Optics Express* (Sep. 4. 2006), 14(18):82478256.
Pinchuk, et al., Focusing a beam of light with left-handed metamaterials, *Solid State Electronics* (Jun. 12, 2007), 51:1381-1386.
Pendry, Negative refraction makes a perfect lens, *Physical Review Letters* (Oct. 30, 2000), 85(18):3966-3969.
Kussow et al., MgB2-based negative refraction index metamaterial at visible frequencies: Theoretical analysis, *Physical Review B* (Nov. 26, 2007), 76:195123-1-195123-7.
Kussow, et al., Optically Isotropic Negative index of Refraction Metamaterial, *Phys. Stat. Sol. B* (Jan. 11, 2008), 245(5):992-997.

\* cited by examiner

*Primary Examiner* — Alicia M Harrington
(74) *Attorney, Agent, or Firm* — Pepper Hamilton LLP

(57) ABSTRACT

Embodiments of the invention described herein include metamaterials that exhibit negative permittivity and negative permeability at optical frequencies, methods for preparing such materials, and devices prepared from same.

28 Claims, 28 Drawing Sheets

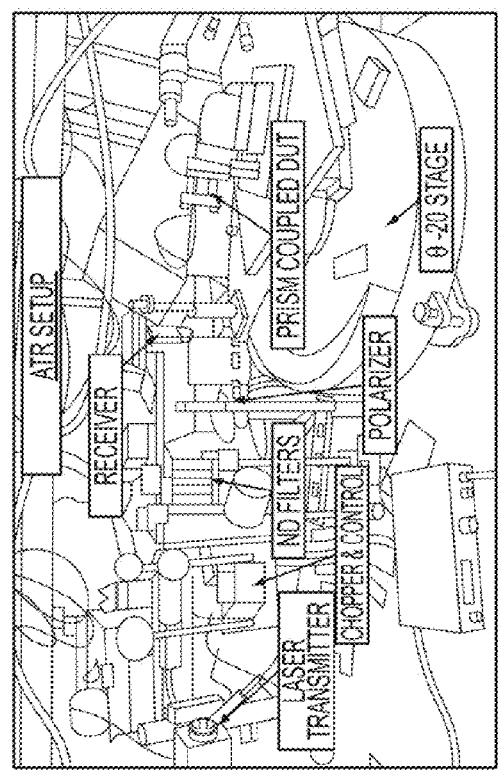
FIG. 17
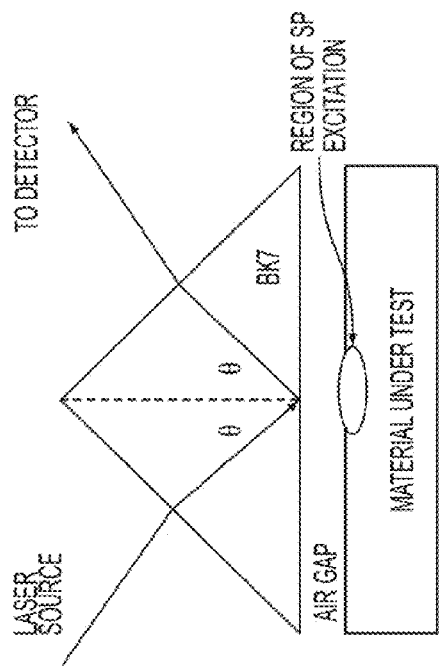

NEGATIVE REFRACTIVE INDEX MATERIALS AND METHODS FOR MAKING SAME

CROSS-REFERENCE TO RELATED APPLICATIONS

This application claims priority from U.S. Provisional Application No. 61/118,123 entitled "Negative Refractive Index Materials and Methods for Making Same" filed Nov. 26, 2008, the contents of which are incorporated herein by reference in their entirety.

GOVERNMENT INTERESTS

This invention was made with Government support under Contract No. W31P4Q-08-C-0153 awarded by the U.S. Army. The Government has certain rights in this invention.

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Negative refractive index materials (NIMs) have extraordinary promise in imaging and lithography applications. Unlike a conventional lens, a negative refractive index implies that when a material refracts an incoming light ray, the refracted ray will be deviated at a negative angle to the normal according to Snell's law, as shown in FIG. 1. This seemingly trivial observation has profound consequences because, as implied by the figure, focusing can be accomplished by a slab of material rather than a conventionally-shaped lens. More subtly, lenses made from NIMs can be much more compact than conventional lenses, and wave vector components along the optical axis can be used for imaging since evanescent waves grow in NIMs instead of decay. In contrast, these components decay at distances very close to the lens surface (the near field) in conventional optics accounting for a loss of imaging information and, ultimately, loss of resolution. Furthermore, a negative index implies that the phase of a wave decreases through NIMs rather than advances. A material with n=−1 can be considered to reverse the effect of propagation through an equivalent thickness of vacuum. Consequently, negative index materials have a potential advantage of forming highly efficient low reflectance surfaces by canceling the scattering properties of other materials, and if the material is isotropic, these effects occur regardless of the direction of the incident wave creating what theoreticians have called this the perfect lens: a planar slab, without reflective losses, which could focus both the propagating and evanescent components of an object and achieve sub-wavelength imaging.

Negative index of refraction metamaterials can be obtained when the electrical permittivity ($\in$) is less than 0 and magnetic permeability ($\mu$) is less than 0. Typically these are achieved when there is resonance behavior in the material. Electrical resonances are common in metals at optical frequencies, but magnetic resonant conditions do not occur in natural materials at these frequencies, therefore the construction of metamaterials involves engineering a negative permeability material using non-magnetic materials. At radio frequencies, this can be done using small (mm-scaled) metallic inclusions to achieve negative effective value for $\mu$ to create structures that have a negative index of refraction in certain microwave bands. These are usually ring-shaped strips of metal, and the magnitude of the magnetic moment that forms from the induced current becomes large (positive or negative) under resonance conditions. More recently, it has been possible to lithographically define tiny optical-frequency resonators in materials, which have resulted in negative index behavior in the visible and near-infrared spectrum. Still, these materials are (1) not isotropic, i.e., the features are planar, and the index varies with orientation, and (2) most of these materials exhibit large optical losses.

Properties that can be exploited using NIMs include:

Reversal of Snell's Law: When light passes through NIMs, the sign on the relationship between incident and refracted light rays changes. Therefore, light is refracted away from the normal instead of toward it. This allows devices such as a flat lens, which may lead to more compact optics, and in curved lenses, NIMs may focus light to a much shorter focal length using less material. There is not a near-field limitation implied with the reversal of Snell's law.

Evanescent Field Grows Instead of Decays: A very interesting consequence of negative index is that the evanescent field within the light will grow exponentially instead of decay as in conventional lenses. As illustrated in FIG. 2, evanescent waves may originate from three interfaces: the object, where it decays; the front of the lens at the aperture, where it begins to grow; and from the back of the lens, where it again decays. In an NIM lens, optical information at the interface is not lost, but can be reconstructed at the image plane. In principle, the resolution of the reconstructed image may be better than the diffraction limit creating a phenomenon known as super-resolution.

A super-resolution lens can be constructed so that the information at the aperture is completely reconstructed, such that there is improved imaging at the plane of the detector of the light that is received. This may create a smaller spot size eliminating some limitations of conventional lenses and allowing for smaller pixels in the detector (or that finer features may be obtained in optical lithography). The image plane created by a NIM lens is in the near field, which is applicable in some applications, but techniques are being developed to project the information at the aperture onto an image plane in the far field as well, e.g., with a grating coupled to the NIM.

NIM properties vary with wavelength: For most applications, a broad band of negative index behavior is preferred, but these are still designed around resonances, and in some cases, a very narrow bandwidth may be desired. Under these conditions, transmission and reflection properties will go through extremes of near-perfect transmission or reflection, and at the proper wavelength can be designed to have negligible reflectance at wavelengths of interest, which is desired in certain optical systems.

BRIEF SUMMARY OF THE INVENTION

Various embodiments are directed to a metamaterial including a matrix material having a negative permittivity ($\in$) at optical frequencies and nanoparticles having a high dielectric constant structured to cause negative permeability ($\mu$) at optical frequencies due to a scattering resonance.

In some embodiments, the matrix material may be a metallic with a plasmon resonance, and in other embodiments, the matrix material may be one or more materials that exhibit negative permittivity and a low Drude loss factor. In such embodiments, the matrix material may include one or more transition metals and metal alloys thereof, and in some embodiments, the matrix material may be polycrystalline magnesium diboride ($MgB_2$). In other embodiments, the matrix material may include nanoparticles of material such as, but not limited to, gold (Au), platinum (Pt), copper (Cu), silver (Ag), nickel (Ni), palladium (Pd), cadmium (Cd), zinc (Zn), and combinations thereof. In still other embodiments, the matrix material further can include one or more polymeric materials.

In some embodiments, the nanoparticles may include one or more transition metal oxides, and in certain embodiments, the nanoparticles may be silicon carbide (SiC) nanoparticles, titanium oxide ($TiO_2$), zirconium oxide ($ZrO_2$), and combinations thereof. In such embodiments, the nanoparticles may have a particle size of from about 10 nm to about 1000 nm, and may have a spherical, pyramidal, cylindrical, or tetrahedral shape. In some embodiments, the nanoparticles may be in a regular arrangement, and in other embodiments, the nanoparticles may be in a random arrangement. In still other embodiments, the nanoparticles may be arranged in a gradient. In some embodiments, the gradient may include spherical nanoparticles of various sizes, and in certain embodiments, the gradient may provide a negative gradient index of refraction. In some embodiments, the nanoparticles may make up from about 10% by volume to about 50% by volume of the metamaterial.

In particular embodiments, the metamaterial may include a surfactant, binder, or combination thereof and in some embodiments, the surfactant, binder, or combination thereof may be less than about 25% by volume of the metamaterial. In certain embodiments, the metamaterial may be a film having a thickness of from less than about 10 μm to about 25 mm, and in other embodiments, the metamaterial may be a coating having a thickness less than about 10 μm. In some embodiments, the metamaterial may exhibit a negative refractive index within the visible spectrum, and in particular embodiments, the metamaterial may exhibit one or more negative refractive index band from about 250 nm to about 1500 nm. In some embodiments, the Drude loss factor of the matrix material may be less than about 0.1, and in other embodiments, the material may be optically isotropic.

Other embodiments include a lens including a matrix material having a negative permittivity (∈) at optical frequencies and nanoparticles having a high dielectric constant structured to cause negative permeability (μ) at optical frequencies due to a scattering resonance.

In particular embodiments, the nanoparticles may be arranged in a gradient, and in some embodiments, the lens may exhibit a negative index of refraction.

Still other embodiments include a method for producing a metamaterial including the steps of combining a matrix material having a negative permittivity (∈) at optical frequencies and nanoparticles having a high dielectric constant structured to cause negative permeability (μ) at optical frequencies due to a scattering resonance to create a powder mixture, encapsulating the powder mixture in a container, and consolidating the powder mixture by hot isostatic pressing to form a metamaterial billet.

In some embodiments, such methods may further include the steps of cutting metamaterial billet. In other embodiments, the hot isostatic pressing may be carried out at from about 600° C. to about 700° C. In still other embodiments, the method may further include the step of milling a matrix material and nanoparticles to produce a milled powder.

Further embodiments include a method for producing a metamaterial including the steps of combining a matrix material having a negative permittivity (∈) at optical frequencies and nanoparticles having a high dielectric constant structured to cause negative permeability (μ) at optical frequencies due to a scattering resonance to create a powder mixture and sintering at reduced temperature to form a consolidated, metamaterial film.

In some embodiments, the method may further include the steps of dispersing the powder mixture in a solvent and allowing a film of the powder mixture to form on a substrate before sintering at reduced temperature. In some embodiment, the solvent may be selected from, but not limited to ethanol, methanol, acetone, and combinations thereof. In other embodiments, the substrate may be a silicon wafer. In still other embodiments, the consolidated, metamaterial film may be from about 100 nm to about 100 μm thick. In further embodiments, the sintering may be conducted using an e-beam, and in some embodiments, the sintering may include a dosage e-beam energy at an interval of from about 25,000 kGy to about 150,000 kGy. In other embodiments, the reduced temperature may be less than about 150° C., and in particular embodiments, the sintering may occur under nitrogen. In still other embodiments, the method may further include the step of milling a matrix material and nanoparticles to produce a milled powder.

Still further embodiments include a method for producing a metamaterial including the steps of dispersing a magnesium salt in organic solvent and reacting with a borohydride compound to form a solution, adding water to the solution to form a second solution, precipitating magnesium diboride from the second solution, collecting the precipitate, and reacting under an atmosphere of diborane.

In some embodiments, the magnesium salt may be magnesium chloride or magnesium boride, and in other embodiments, the borohydride may be sodium borohydride. In certain embodiments, the method may further include the step of spin casting the precipitate, and in other embodiments, the method may further include reacting the precipitate under an atmosphere of diborane.

Yet other embodiments are directed to a method for focusing parallel beams of light comprising directing a beam of light through a lens having a negative gradient of refraction. In some embodiments, the lens may include a matrix material having a negative permittivity (∈) at optical frequencies and nanoparticles having a high dielectric constant structured to cause negative permeability (μ) at optical frequencies due to a scattering resonance arranged in a gradient. In other embodiments, the beam of light emanates from an object in far field of the lens.

DESCRIPTION OF DRAWINGS

For a fuller understanding of the nature and advantages of the present invention, reference should be made to the following detailed description taken in connection with the accompanying drawings, in which:

FIG. 17 shows an SPR apparatus. In a NIM, surface plasmons will be excited for both s- and p-polarized light. In a normal conductor, only the p-polarization can excite a surface plasmon.

DETAILED DESCRIPTION

Figure 1:
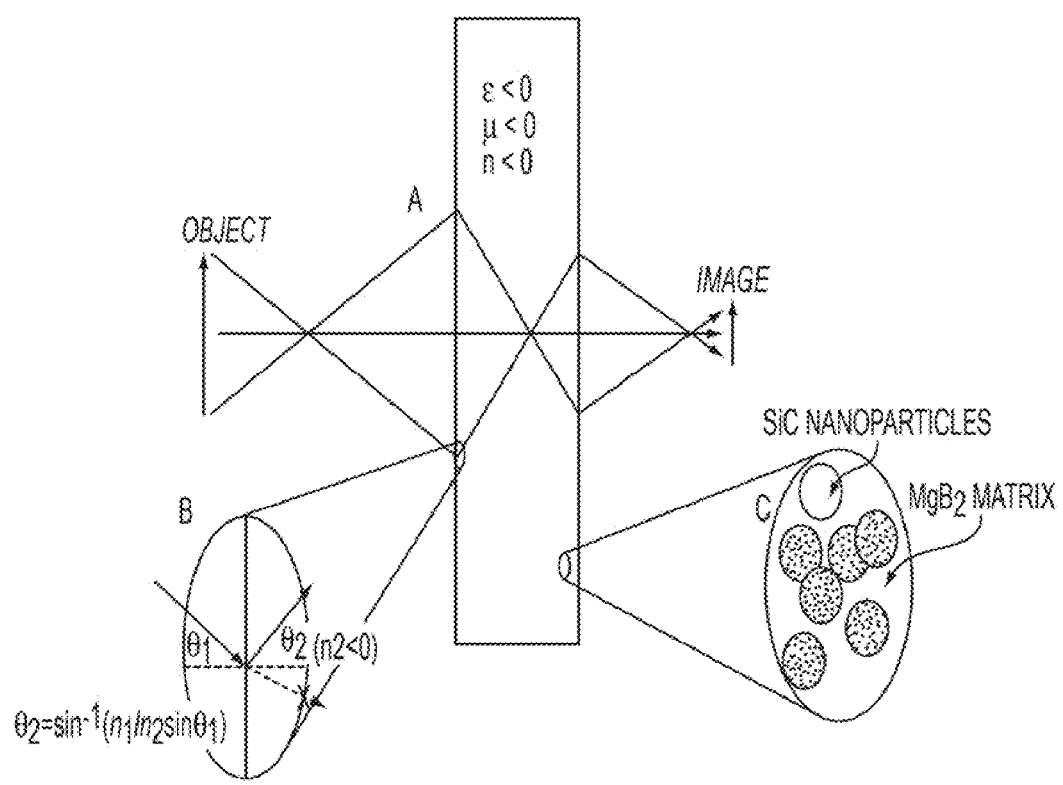
FIG. 1 shows a "perfect lens" of a negative index material (NIM): (A) shows a flat slab of metamaterial (with greater allowed resolution), (B) illustrates incident beams refracting at a negative angle to the normal, and (C) shows a metamaterial consisting of a distribution of nanoparticles randomly distributed in a matrix material.
Figure 2:
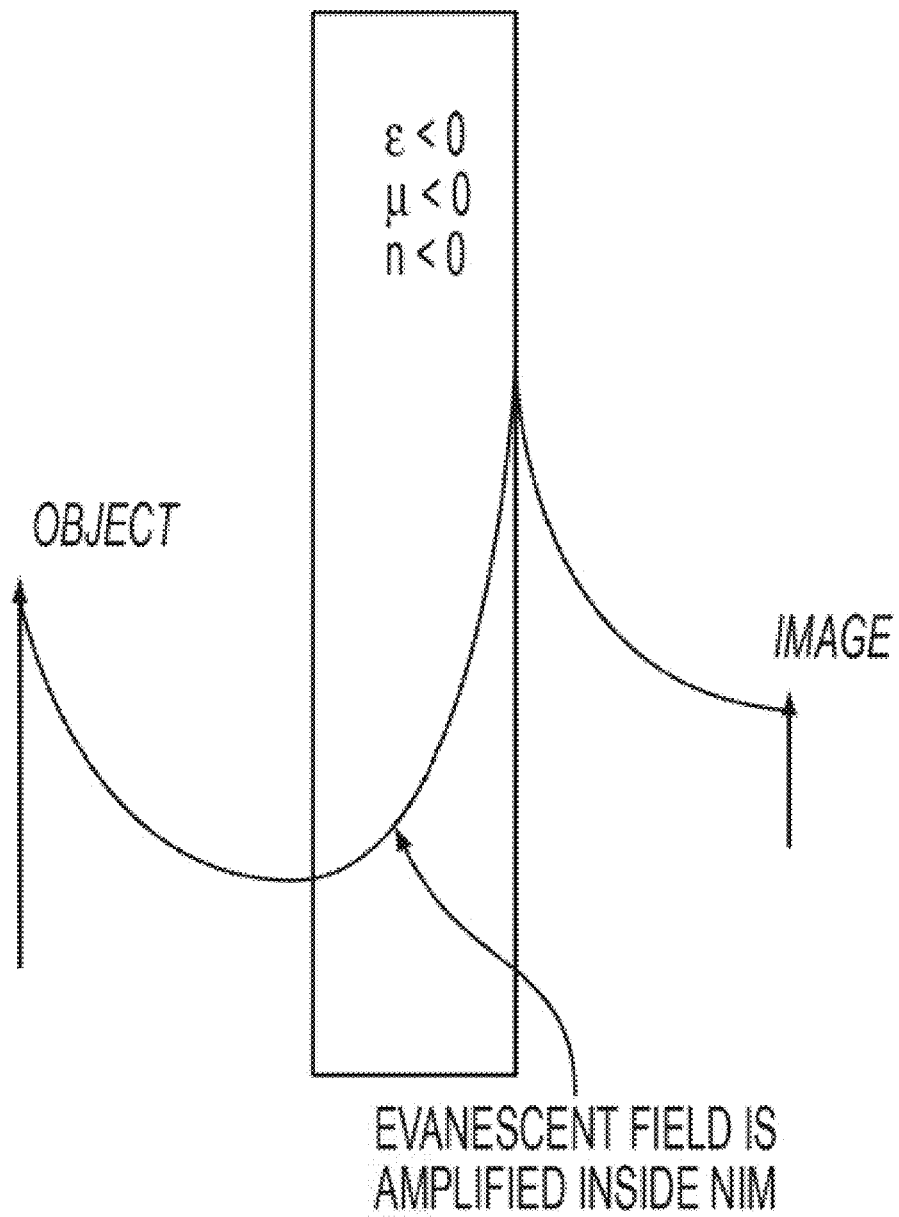
FIG. 2 shows an evanescent field is amplified within a NIM.

It must also be noted that as used herein and in the appended claims, the singular forms "a", "an", and "the" include plural reference unless the context clearly dictates otherwise. Thus, for example, reference to a "cell" is a reference to one or more cells and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

The invention described herein is generally directed to optically isotropic metamaterials that are active in the visible spectrum. Such materials may include a host material exhibiting negative permittivity ($\in$) at optical frequencies, and nanoparticles dispersed in the host material that exhibit a Mie resonance that provides a negative permeability (µ).

Any host material that exhibits negative permittivity may be used in various embodiments of the invention, and in particular embodiments, the host material may also exhibit low dielectric losses in the visible spectrum. For example, in some embodiments the host material may exhibit negative permittivity and have a low intrinsic (Drude) loss factor; and in other embodiments the host material may be a composite material composed of more than one material, and the composite may exhibit negative permeability and/or low Drude loss. In some embodiments, such a host material may include at least one transition metal including any material between group 2 elements and group 13 elements on the periodic table of elements; and in some embodiments, the host material may include one or more noble metals. For example, in some embodiments, the host material may be a substantially pure transition metal such as, but not limited to, gold, Au; platinum, Pt; copper, Cu; silver, Ag; nickel, Ni; palladium, Pd; mercury, Hg; cadmium, Cd; zinc, Zn; magnesium, Mg; and the like and, in other embodiments, the matrix material may include one or more polymeric materials. For example, in some exemplary embodiments, the host material may be aggregated nanoparticles, such as gold nanoparticles, and in other exemplary embodiments the nanoparticles may be combined with a polymeric material that fills voids within the material between nanoparticles. In such embodiments, a dispersion of, for example, gold nanoparticles host material may exhibit reduced dielectric losses due to air, and in other such embodiments, a host material may include a polymer with n>1 between gold nanoparticles. In other embodiments, the host material may include one or more metal alloys or superconducting materials including, for example, any transition metal or noble metal provided above, such as, for example, magnesium diboride ($MgB_2$).

Similarly, nanoparticles of any composition and structure that exhibit negative permeability may be used in embodiments. In some embodiments, the nanoparticles may be carbide containing nanoparticles such as, for example, silicon carbide (SiC) and the like. The magnetic response of the metamaterial is a result of collective oscillations of charges in the random (or regular) array of dielectric particles, as explained by Mie theory. A higher dielectric constant implies that more current can be induced in the particles and thus, SiC ($\in$~6.5) may be considered an appropriate material. However, dry SiC powders are difficult to get into liquid suspension and may require excessive surfactant in the final film formulation. Therefore, in other embodiments, transition metal oxides such as, for example, titanium oxide, $TiO_2$; zirconium oxide, $ZrO_2$; and the like may be used as alternatives to SiC because, for example, $TiO_2$, has an $\in$ value of about 6.2 or 8.4 depending on the crystal phase and sufficient current can be induced in such particles. Additionally, transition metal oxide particles may allow fabrication strategies, such as sol-gel synthesis, and suspension stabilization in aqueous or alcoholic solvents by well-known techniques.

The size and shape of the nanoparticles of various embodiments may vary. In general, the nanoparticles of embodiments may have an average particle size from about 10 nm to about 1000 nm, and in some embodiments, the average particle size may be from about 50 to about 800 nm, about 75 nm to about 750 nm, or about 100 to about 500 nm. In such embodiments, the particle size may be uniform wherein each nanoparticle of the optically isotropic metamaterials has substantially the same average particle size, and in other embodiments, the particle size may not be uniform. For example, in particular embodiments, a first portion of the nanoparticles may have a first average particle size and one or more other portions of the nanoparticles in metamaterial may have smaller average particle sizes or larger average particle sizes than the first average particle size.

Figure 3A:
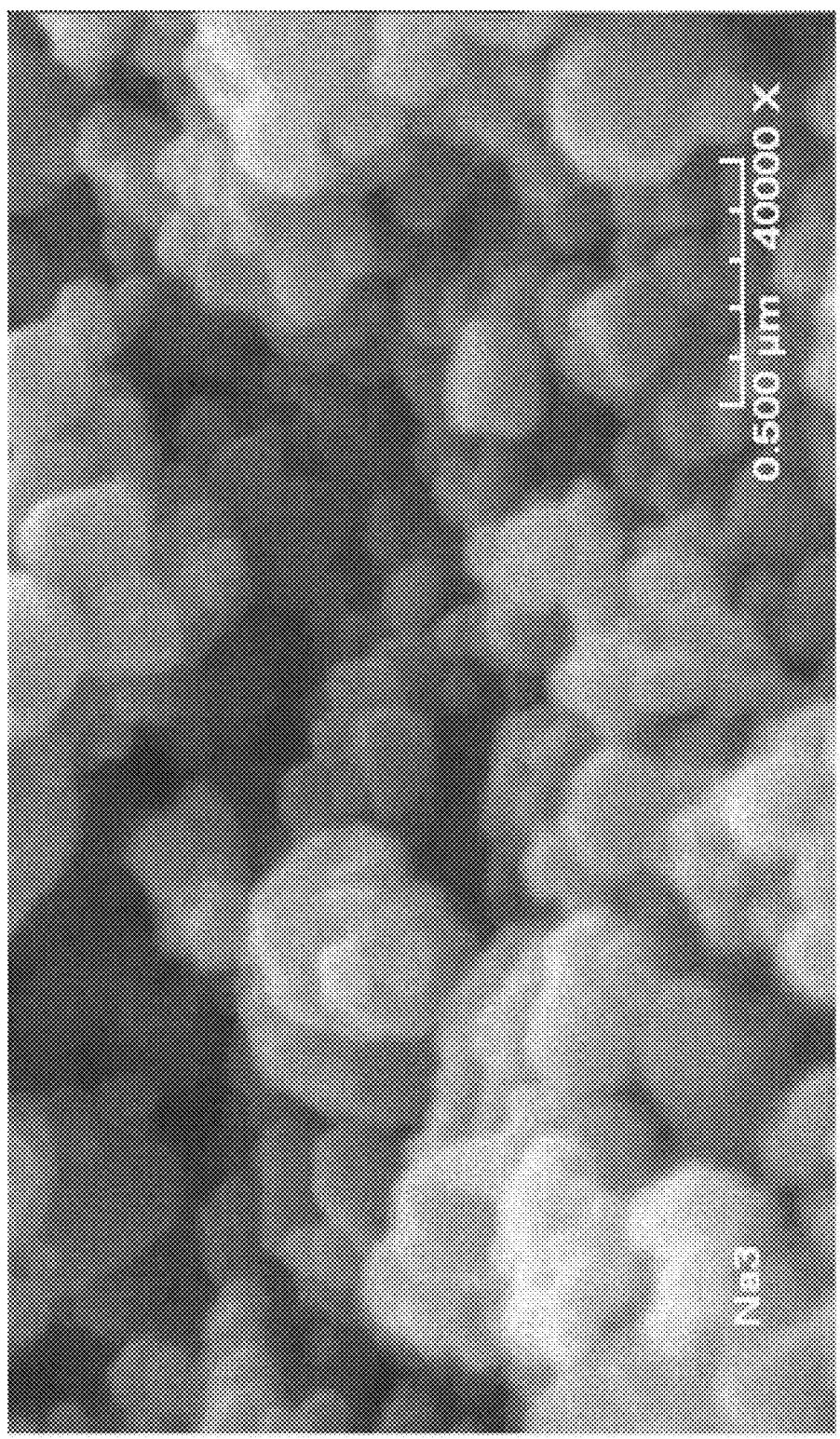
FIG. 3A shows scanning electron micrographs of commercially available 130 nm β-SiC nanoparticles and FIG. 3B shows scanning electron micrographs of commercially available ultrafine β-SiC nanoparticles.
Figure 3B:
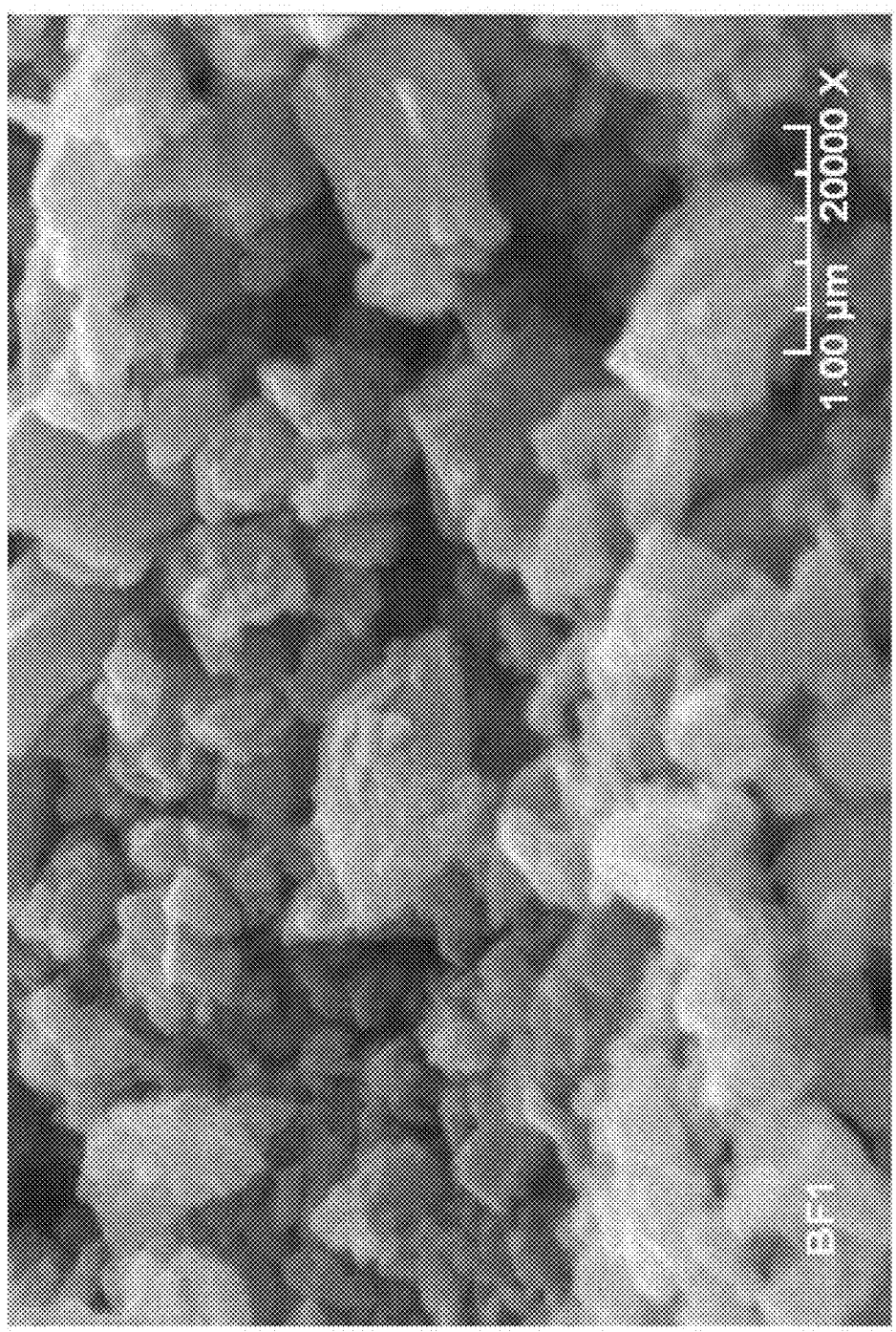

The nanoparticles of such embodiments may be of any shape. For example, in some embodiments, the nanoparticles may be spherical or nearly spherical, and in other embodiments, the nanoparticles may have a polyhedral shape such as, but not limited to, cubical, cuboidal, rhomboidal, cylindrical, octahedral, icosahedral, and the like. In still other embodiments, the nanoparticles may have an irregular shape such that, for example, a portion of the nanoparticle appears spherical and another portion appears angular, forming a hemispherical structure, or various edges or vertices of the polyhedron may be rounded, smoothed or removed. In particular embodiments, the nanoparticles may be present in an array of non-uniform shapes including any of those shapes recited above. For example, scanning electron micrographs (SEM) of exemplary SiC nanoparticles are provided in FIG. 3, which illustrates the variety of shapes and sizes of nanoparticles. FIG. 3A shows 130 nm β-SiC nanoparticles having a mean particle diameter of about 190 nm with a standard deviation of about 50%, and FIG. 3B shows ultrafine β-SiC nanoparticles having a mean particle diameter of about 500 nm with a standard deviation of about 50%.

The arrangement of the nanoparticles in the host material may also vary. For example, in some embodiments, the nanoparticles may be regularly arranged, and in other embodiments, the nanoparticles may be randomly arranged. In still other embodiments, the nanoparticles of a portion of the material may be regularly arranged, and the nanoparticles of another portion of the material may be randomly arranged. The nanoparticles of various embodiments may be dispersed uniformly throughout the material, or they may be concentrated in one or more portion of the material. In still other embodiments, the nanoparticles may be of a range of average particle sizes.

Figure 4:
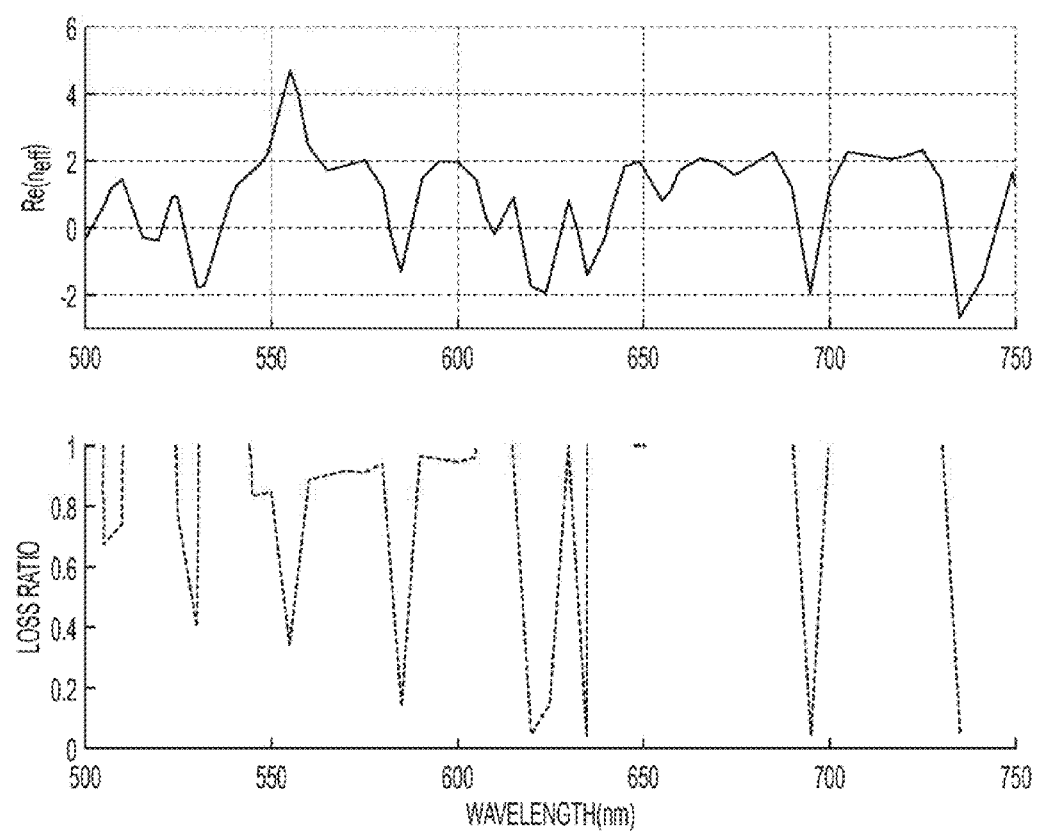
FIG. 4 shows the real part of $n_{eff}$ and the loss ratio, calculated using the ellipsometric data of the MgB$_2$ made by HIP, and assuming randomly distributed SiC spheres (500 nm diameter and filled at 30 vol %).

Without wishing to be bound by theory, the position of the negative μ band may be controlled by varying the size and volume fraction nanoparticles. Thus, the nanoparticles of various embodiments may be structured to cause negative permeability (μ) at optical frequencies. Moreover, the nanoparticles can be engineered to coincide with the negative $\in$ band originating from the host material. For example, as shown in FIG. 4, there is a region where the real part of the refractive index is negative, and in this region, the imaginary part is close to zero. Therefore, for thin samples, the material should be highly transmissive because the imaginary part of the index is close to zero. In particular embodiments, multiple bands of negative refractive index and low optical losses can be engineered in the same material. For example, FIG. 4 shows multiple bands of negative index calculated for a $MgB_2$/SiC metamaterial made by hot isostatic pressing, using measured optical properties of $MgB_2$.

Figure 5:
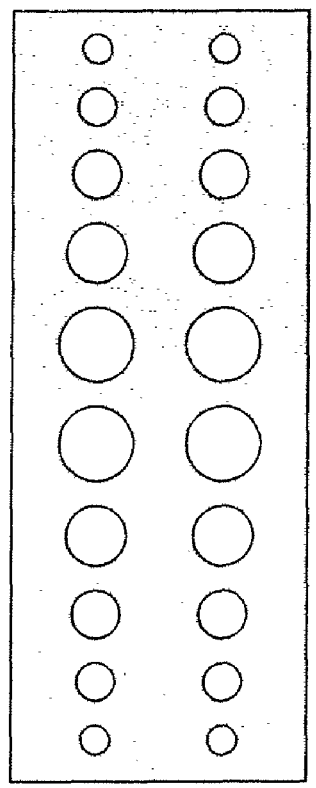
FIG. 5 shows an exemplary lens designed with a gradient index of refraction.

In certain embodiments, the nanoparticles may be provided in a gradient within the host material. For example, in some embodiments, nanoparticles of various sizes may be provided in a gradient, as illustrated in FIG. 5, in which the nanoparticles are arranged in a gradient of small to large nanoparticles. In other embodiments, nanoparticles of similar sizes may be used to create a concentration gradient within the host material. Without wishing to be bound by theory, a gradient of nanoparticles may create a gradient negative index of refraction within the material, and while the random or regular arrays of nanoparticles described above may allow for a superlensing effect when both object and image are in the near-field of the superlens, gradient negative index refraction materials may allow for a superlens that achieves sub-wavelength resolution when the object is in the far-field. The proposed mechanism is based on the phase correction which arises from the different optical lengths of parallel beams of light as they travel through different parts of the slab with different indices of refraction. This should lead to focusing of the parallel beams of light emanating from the far-field object similar to a conventional convex lens. If the gradient index of refraction is negative, such materials may allow for focusing of parallel beams of light emanated from a source far from the lens, i.e. far-field, and provide a superlens which allows for subdiffraction size imaging.

Such superlenses may exhibit negative permeability and negative permittivity which may allow for better control of the negative index of refraction and may provide a broader frequency regime when the index of refraction is negative. Such superlenses may further exhibit low losses, and in some embodiments, the low losses may be a function of the spatial coordinates of the nanoparticles in the host material. For example, in such embodiments, nanoparticles of various sizes may be positioned some distance apart from one another. The nanoparticles must be smaller that the wavelength of the incidence light. However, the wavelength of the incidence light cannot be too large, since the waves passing through the lens decay exponentially and must not be damped entirely.

In certain embodiments, the nanoparticles of a superlens may include spheres of varying sizes and may be ordered as illustrated in FIG. 5. Without wishing to be bound by theory, such superlens may exhibit an effective negative epsilon and an effective negative permeability, which may lead to a low-loss negative index of refraction. The resulting gradient negative index may be similar to the waveforms shown in FIG. 6 for different focal lengths. Thus, in some embodiments, the materials having a gradient negative index of refraction may be useful for providing sub-wavelength resolution of objects in the far-field that are projected in the near field. In other embodiments, materials having a gradient index of refraction may include surface plasmon coupling (via the grating) to project an far-field object into the far-field.

In particular embodiments, the host material may $MgB_2$ or gold and the nanoparticles may be SiC, and in some embodiments, the host material may be gold nanoparticles encompassed by a polymeric material and the nanoparticles may be SiC. Therefore, the metamaterial of embodiments may be $MgB_2$/SiC, Au/SiC, or Au/polymer/SiC. The SiC nanoparticles may be of any shape or a variety of shapes and may have either a regular or random distribution in the host material, and in certain embodiments, the nanoparticles may be regularly dispersed in the host material.

Figure 6:
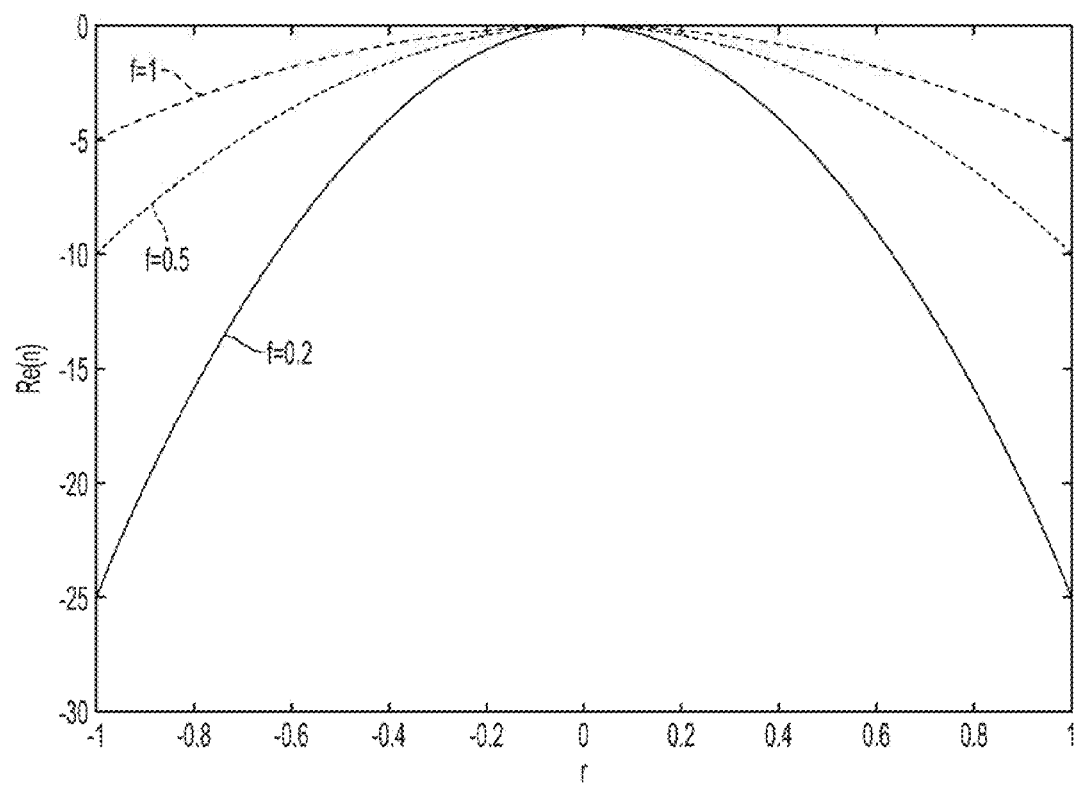
FIG. 6 shows an exemplary variation of the real part of the negative index of refraction for a gradient index of refraction lens.

The suggested structure of optically isotropic metamaterials including a matrix or host material of polycrystalline magnesium diboride in a normal state, at room temperature, with randomly embedded spherical nanoparticles of SiC, is provided in FIG. 6, which are active in the visible spectrum described above. An alternate material consists of Au and SiC nanoparticles of different sizes, with air, or another low-index material, in the interstices filling voids between the particles. Such metamaterials may exhibit negative refraction index behavior with extremely low losses, and in the case of $MgB_2$/SiC, this result stands for both random and regular distribution of SiC nanoparticles in the $MgB_2$ matrix.

Negative refractive index can be predicted using either the effective medium theories or numerical methods such as the rigorous FDTD method or a combination thereof. Effective medium theories, including the extended Maxwell-Garnett theory for random arrangements, may be used to consider the effects of the collective scattering behavior of the particles and to properly adjust the parameters of the metamaterial. FDTD simulations may be used to validate the results and to gain further insight through full-wave simulations. The Mie resonance due to inclusions of SiC or other dielectric nanoparticle may be observed at some frequency range, $\Delta\omega_{\mu_{eff}<0}$, with the effective permeability $\mu_{eff}<0$. Due to Drude-like behavior of the matrix, the effective permittivity $\epsilon_{eff}<0$ occurs at frequencies below the material's plasmon resonance. By the self-consistent adjustment of the fill factor, f, and the radius of the dielectric spheres, a set of conditions can be reached where these regions overlap, and negative refraction index occurs within the visible region when both $\epsilon_{eff}$ and $\mu_{eff}$ are simultaneously negative.

At optical frequencies, the matrix of the NIM (which controls the permittivity) should satisfy two requirements. First, the permittivity $\epsilon(w)$ should obey the Drude-like (or similar) behavior (Eq. 1) with a plasmon frequency, $\omega_p$, within an optical range. Secondly, the losses, $\gamma$, should be small.

$$\varepsilon(\omega) = \varepsilon_\infty - \frac{\omega_p^2}{\omega^2 + i\gamma\omega} \quad (1)$$

Figure 7:
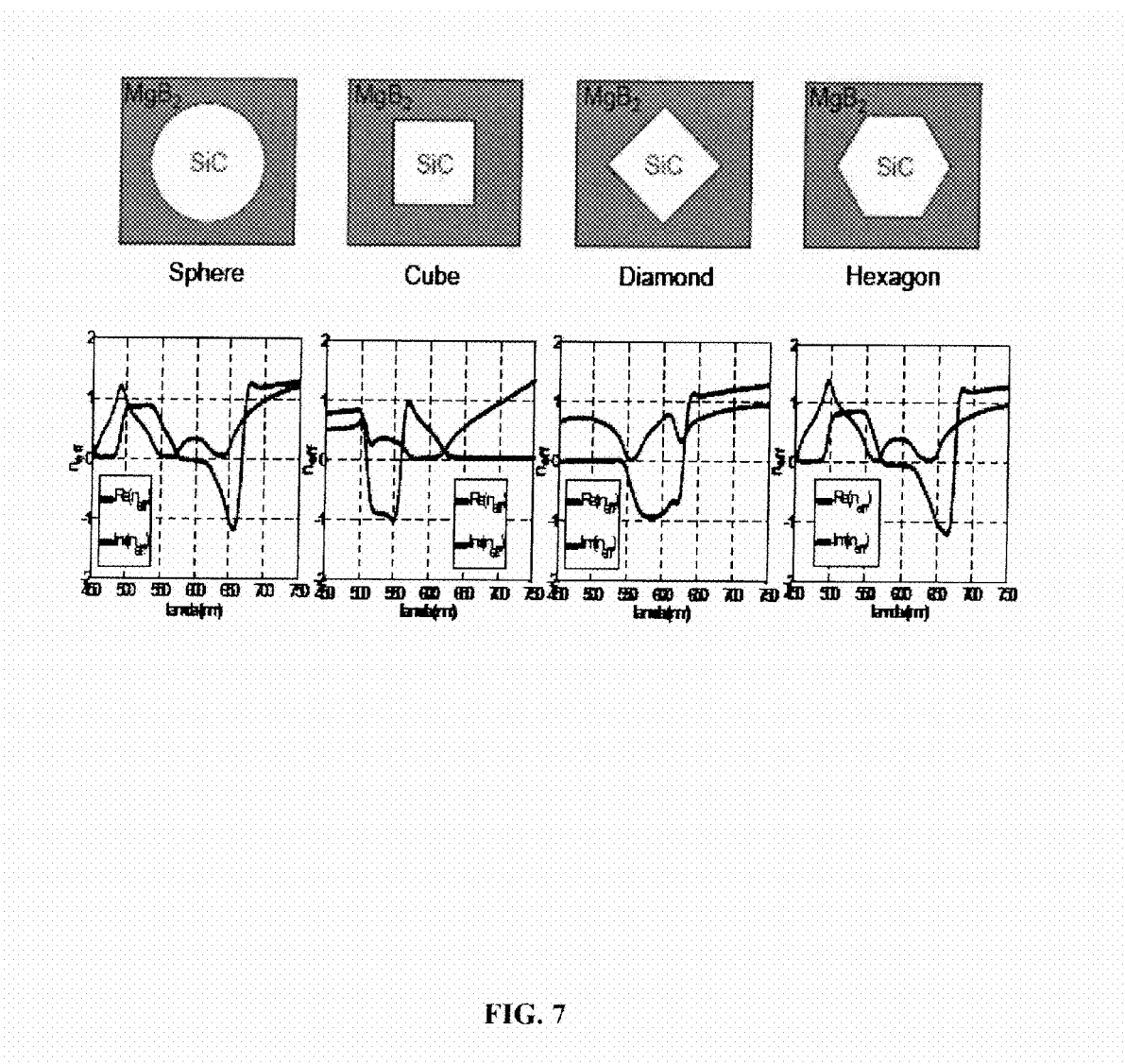
FIG. 7 shows FDTD analysis of nanoparticles having different shapes embedded in MgB$_2$ for real and imaginary parts of the index of refraction.
Figure 8:
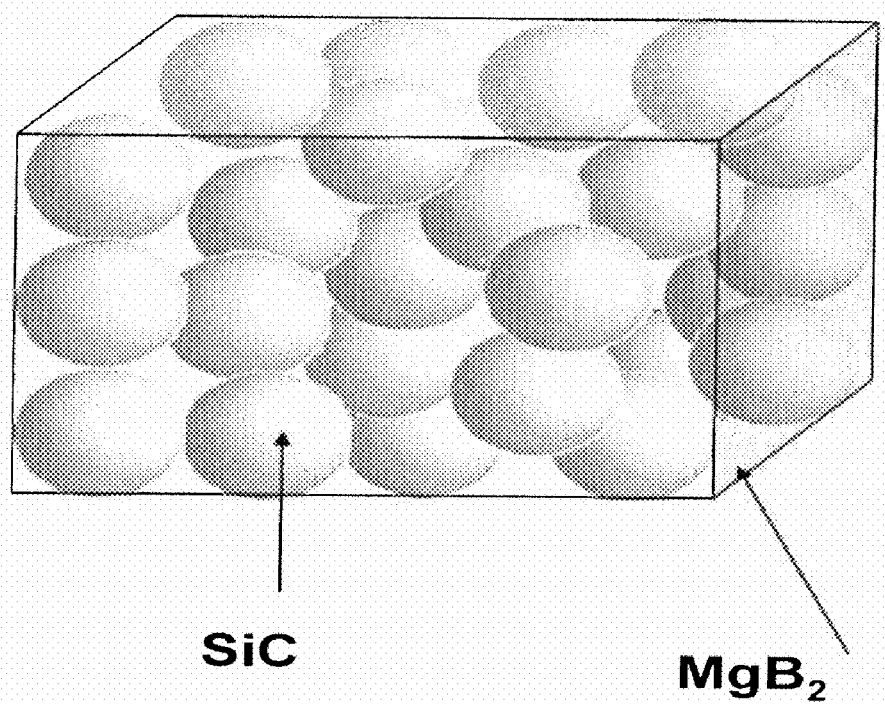
FIG. 8 shows a metamaterial comprised of SiC spheres with a volume fraction of about 30% randomly distributed in an MgB$_2$ matrix. Particle sizes may range from 130-500 nm, depending on the properties of the MgB$_2$ and which plasmon band is exploited.

Many recently reported NIMs in optical range exhibit large losses, mostly due to the fact that noble metals (Au, Ag), which have considerable plasmon losses, were utilized as the components of the NIMs. The metamaterial of embodiments of the invention utilizes a superconductor material, $MgB_2$, instead of a noble metal as a matrix, which has both theoretically and experimentally verified low losses. These, however, can be very sensitive to the defect structure of the $MgB_2$. For purposes of the discussion herein, "defects" have been lumped into the Drude loss factor, $\gamma$. The loss factor can be increased to generate a perhaps more realistic picture of the $MgB_2$. Calculations have shown that even with a modest loss factor, the material still generates NIM bands with relatively low overall losses. FIG. 7 shows calculations with a favorable ($\gamma$=0.01 eV) and unfavorable ($\gamma$=0.25 eV) value of the loss factor. Also, there are at least two Drude-like regions of behavior of $MgB_2$, and a NIM can be designed around the UV or the visible plasmon resonance, each may require differently sized SiC inclusions.

The dielectric behavior of the host material contributes most strongly to the effective permittivity of the NIM, but it is not independent of the properties of the guest. The effective magnetic properties of the NIM come about exclusively from the collective scattering of the inclusions. For illustration, the effective permittivity ($\epsilon_{eff}$) and permeability ($\mu_{eff}$) can be averaged according to extended Maxwell-Garnett theory, which describes the scattering of light (with the wavelength $\lambda$) by particles of finite size (subscript s) randomly distributed in a host (subscript h). The effective parameters are given by the following formulas:

$$\varepsilon_{eff} = \varepsilon_h \frac{x^3 - 3ifT_l^E}{x^3 + \frac{3}{2}ifT_l^E} \quad (2)$$

$$\mu_{eff} = \mu_h \frac{x^3 - 3ifT_l^H}{x^3 + \frac{3}{2}ifT_l^H} \quad (3)$$

where f is the volume fraction, and $T_l^E$ and $T_l^H$ are the elements of the scattering matrix for single spheres, given by:

$$T_l^E = \left[\frac{j_1(x_s)[xj_1(x)]'\varepsilon_s - j_1(x_s)[x_s j_1(x_s)]'\varepsilon_h}{h_1(x)[x_s j_1(x_s)]'\varepsilon_h - j_1(x_s)[xh_1(x)]'\varepsilon_s}\right], \quad (4)$$

$$T_l^H = \left[\frac{j_1(x_s)[xj_1(x)]'\mu_s - j_1(x_s)[x_s j_1(x_s)]'\mu_h}{h_1(x)[x_s j_1(x_s)]'\mu_h - j_1(x_s)[xh_1(x)]'\mu_s}\right],$$

in which $x_s$ ($=2\pi r(\epsilon_s\mu_s)^{1/2}/\lambda$) and x ($=2\pi r(\epsilon_h\mu_h)^{1/2}/\lambda$) are dimensionless radii, $j_1$ and $h_1$ are spherical Bessel and Hankel functions of the first kind, and the prime indicates a derivative. In these calculations, the radius of SiC and the fill factor constitute the design parameters, and they can be used to find a negative index band at certain particle radius and volume fraction.

Figure 9:
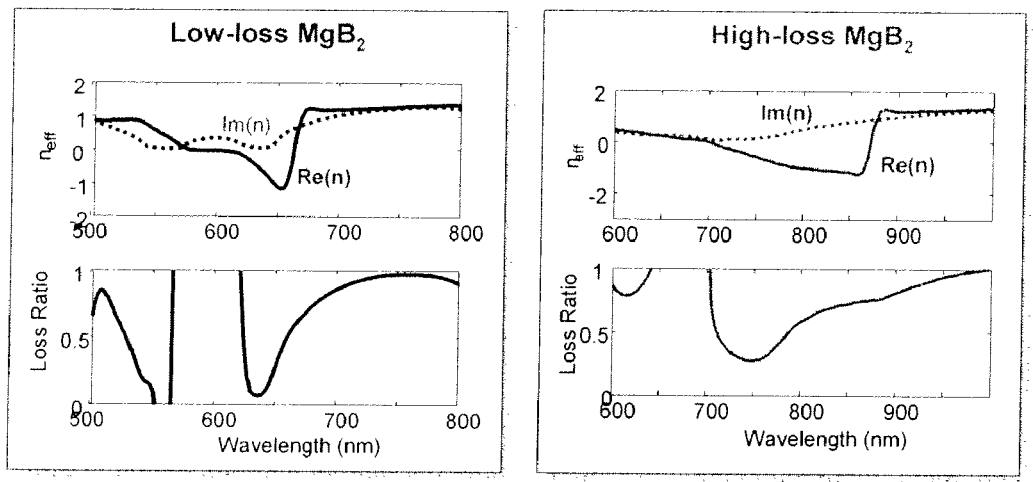
FIG. 9 shows the effective index of refraction and the loss ratio calculated for the low-energy plasmon dielectric function of MgB$_2$. The loss ratio is the imaginary part of the refractive index divided by the real part (|Im(n)/Re(n)|). These calculations assume Drude loss factors for MgB$_2$, γ=0.01 (low loss, consistent with literature values) and 0.25 eV (high loss).

In various embodiments, it may be assumed that dielectric properties are averaged over three dimensions, that is, that the $MgB_2$ host material is polycrystalline, with no alignment of the crystal axes. FIG. 9 displays the results of calculation using the lower-energy ($\omega_p$=2.1 eV) dielectric function for MgB$_2$, considering the worst case for defects, averaged according to the extended Maxwell-Garnett and Lewin effective medium models. This uses our most conservative estimate for the loss factor, $\gamma$=0.25 eV, corresponding to a highly defected matrix, and (in this case) $r_{SiC}$=150 nm, a volume fraction of 0.3, and literature values of $\epsilon_{SiC}$=6.8+0.01i. Even with extremely high losses, both the models used predict a NIM region within the ~700-850 nm, and 700-825 nm, respectively. The loss ratio is the ratio of the real and imaginary part of the effective refractive index ($|Im(n_{eff})/Re(n_{eff})|$). A loss ratio below one means that a wave will propagate through the medium faster than it is absorbed. The loss ratios of both the models are less than 1 in the entire NIM band, and less than 0.5 within most of the NIM region, even for the highly defective matrix.

In other embodiments, the metamaterial may include randomly distributed small gold nanoparticles in free space, constituting the host medium, with spherical SiC nanoparticles embedded in this host. The theoretical analysis of this material is similar to that presented above, although the losses are expected to be higher, in general due to the intense scattering of gold and indicates that this metamaterial also exhibits isotropic negative refraction in the visible spectrum. The numerical analysis includes both the effective medium theories and FDTD simulations. It should be noted that preliminary calculations done during this program suggest that an interstitial medium other than "free space" will also result in a negative index band.

Figure 10:
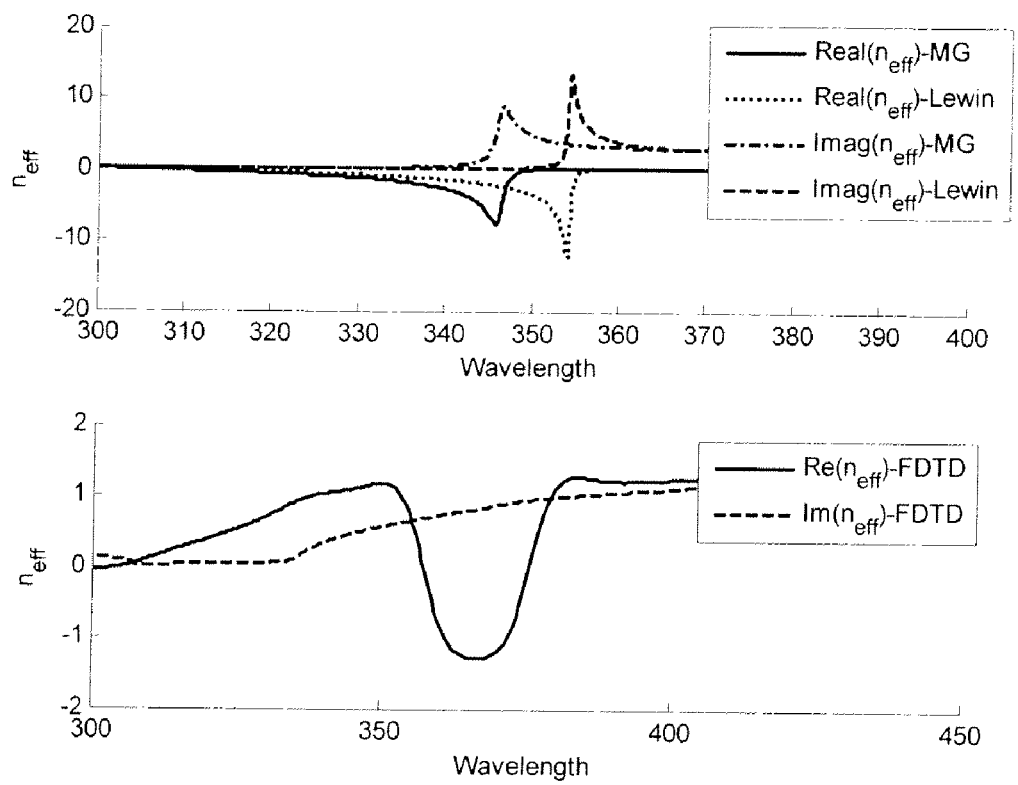
FIG. 10 shows (A) real and imaginary parts of the effective negative index of refraction using two different models, and (B) results for the real and imaginary parts of $n_{eff}$. The sizes of nanoparticles and their fill factors are: $r_{Au}$=10 nm, $r_{SiC}$=65 nm, $f_{Au}$=0.46, $f_{SiC}$=0.3.

It can be inferred from FIG. 10 that the loss factor, i.e., the ratio of magnitudes for the real and imaginary parts of $n_{eff}$, in the negative index band of the Au/SiC material is more modest than for the MgB$_2$/SiC material, even in the best case considered.

As described above, calculations for theoretical MgB$_2$/SiC, and Au/SiC indicate that such materials will exhibit the qualities of a NIM. Such calculations assume that spherical SiC nanoparticles are randomly distributed with a particular fill factor, which specifies distance between the particles because highly aggregated SiC nanoparticles would negate the resonance effects that cause negative effective magnetic permeability. Additionally, simulations with two similarly sized SiC nanoparticle spheres, which very roughly approximating a size dispersion, indicate that the negative refractive index effect observed in simulations of spherical nanoparticles of a single size would not be cancelled. Moreover, calculations made for SiC nanoparticles of different shapes, e.g., cylinders, tetrahedra, verify that such materials exhibit a similar negative index band as predicted for spheres although the losses and band position may be different.

Real SiC nanoparticles are not uniformly spherical and are polydisperse, see, FIG. 3. Moreover, SiC nanoparticles can be any combination of amorphous and two crystal ($\alpha$ and $\beta$), which fortunately have similar dielectric properties, and most commercially available SiC nanopowders are produced by grinding larger particles to create nanoparticles having a smallest particle sizes of about 0.25 μm (250 nm). However, particles made by grinding are more irregularly shaped than those condensed from the gas phase. Accordingly, simulations using Finite Difference Time Domain (FDTD) code were carried out to test whether different shapes would result in similar bands of negative index of refraction. As illustrated in FIG. 7, these simulations indicate that particles of alternate shape still are likely to produce NIM behavior. In these simulations, there are small differences in particle volume, which probably account for at least some of the shift in band position. However, for particles of different shape, there may not always but frequencies in which low loss (where Im(n) is low) overlaps with negative index. Therefore, without wishing to be bound by theory, the use of nanoparticles that are close to spherical may be preferred in practice of embodiments of the invention.

Optical data for MgB$_2$ slabs were obtained (see Example 5) and were fit to the theoretical model for the negative index of refraction for SiC nanoparticles discussed above to find effective refractive index behavior for MgB$_2$/SiC materials, using both random and regular distribution of spherical SiC particles and the complex permittivity of MgB$_2$. The particle size and volume fraction was varied in these simulations. FIG. 4 shows the results of a theoretical MgB$_2$ host material with 500 nm SiC nanoparticles ($\epsilon$=6.8+0.1i) and a fill factor (loading) of 30%. This results indicate multiple refractive index bands occurring in the visible spectrum with loss ratios less than 0.5, which suggests that waves will propagate through this material in the negative index bands.

Embodiments of the invention are also directed to making such metamaterials. MgB$_2$ has been discovered to be a high temperature superconductor (T$_c$=39 K), which can be made under similar conditions by either reacting a mixture of Mg and B or sintering MgB$_2$ powder at temperatures between 600 and 1100° C. A chief fabrication challenge may be the high vapor pressure of magnesium, which may cause loss of mass and result in Mg-poor phases such as MgB$_4$. Another challenge may be the tendency of Mg and B to react with their environment at high temperature, e.g., Mg may oxidize with any air in the system and alloy with other metals present. Additionally, fully eliminating voids and pores may be difficult under these reaction conditions. Therefore, high pressure and/or careful control of the atmosphere or heating profile may be important in embodiments of the invention. For example, typical, superconducting grades of MgB$_2$ must be processed under hermetic conditions, and for good density, high pressure must also be applied.

For instance, an exemplary method for preparing the metamaterials of the invention may include powder-in-tube (PIT), in which MgB$_2$ (or Mg and B) may be loaded into a metal (e.g., Nb, Ti, Fe, or Ta) tube under inert conditions and the sealed tube is then drawn through a die and pressed into a thin ribbon for production, wires and ribbons, which may be useful for use in superconductive power transmission lines. The ribbon produced by such methods can then be annealed ex situ. In other embodiments, metamaterials such as those described above can be prepared by methods may include (1) hot isostatic pressing (HIP), which is a powder consolidation technique that uses a similar encapsulation technique, but may be used to produce a solid billet instead of a ribbon, (2) low-temperature electron beam sintering, which may prevent Mg evaporation and (3) conversion of a sol-gel precursor under a diborane atmosphere.

Various embodiments of the invention include methods for preparing a metamaterial using hot isostatic pressing (HIP) wherein compressed gas may be used to exert pressure on a metal powder or mixture of metal powders which are loaded into a ductile metal container (called a "can") and simultaneously heating the material in the container to allow sintering to occur. For example, in some embodiments, such methods may include the steps of combining a host material having a negative permittivity ($\epsilon$) at optical frequency and dielectric nanoparticles structured to cause negative permeability ($\mu$) at optical frequencies to produce a powder mixture, encapsulating the powder mixture in a container, and consolidating the powder mixture using hot isostatic pressing to produce at metamaterial billet. In such embodiments, the step of consolidating the powder mixture may include the steps of placing the filled container in a chamber with an inert gas such that the pressure inside the container is from about 5000 psi to about 15000 psi, and simultaneously heating the container. The temperature to which the container is heated may vary, and in certain embodiments, the heating may be carried out to a temperature of from about 600° C. to about 700° C. In particular embodiments, the method may further include the step of cutting the billet to produce a metamaterial slab and/or lens, and polishing the billet or the cut billet to remove rough surfaces and/or surface impurities. Additionally, in some embodiments, the container which can may be produced in an inert or evacuated atmosphere such that air and water are excluded during welding. As described in Examples 1 and 2, HIP has been used to make excellent quality pure $MgB_2$ and $MgB_2$/SiC samples.

In various other embodiments, metamaterials may be prepared by low-temperature e-beam sintering. For example, in some embodiments, the metamaterial may be prepared by a method which includes the steps of combining a host material having a negative permittivity (∈) at optical frequency and dielectric nanoparticles structured to cause negative permeability (μ) at optical frequencies to produce a powder mixture, dispersing the powder mixture in a solvent to form a dispersion, dispensing the dispersion onto a substrate, allowing the solvent to evaporate such that a film of the powder mixture may form on the substrate, and subjecting the powder mixture film to e-beam sintering to produce a consolidated metamaterial. In such embodiments, the solvent may be any volatile liquid capable of evaporating at or near room temperature such as, but not limited to, ethanol, methanol, acetone, and the like, and combinations thereof. The substrate of embodiments may be any substrate used in such sintering techniques known in the art, such as, for example, a silicon wafer. The parameters such as dose and film thickness may be optimized and varied depending upon the materials use. For example, in some embodiments, the dosage interval for the film may be from about 25,000 kGy to about 150,000 kGy, and the sintering may occur at a temperature of less than about 150° C. In certain embodiments, the sintering may take place under an inert environment such as, for example, under nitrogen. In other embodiments, the method may further including grinding or milling the starting materials to produce a powder mixture having a smaller particle size. Without wishing to be bound by theory, reducing the average particle size may eliminate pores in the final material. In embodiments in which the metamaterial is formed using e-beam sintering, the consolidated metamaterial may have a thickness of from about 100 nm to about 100 μm.

At the temperatures where $MgB_2$ sintering occurs (>600° C.), magnesium has a high vapor pressure, and to make high quality sintered materials, it may be necessary to either use careful encapsulation and high pressure processes like HIP or PIT techniques, or controlled chemical environments (e.g., excess Mg vapor). In e-beam sintering, the process may be carried out so rapidly that a stoichiometric imbalance may be less of the problem. Additionally, SiC may remain intact and well-distributed in the $MgB_2$ matrix during the sintering step.

Additionally, e-beam sintering may be used for processing thin samples of $MgB_2$ at low temperature. The accelerated electrons produced during this process are extremely energetic, but they are absorbed within the top 100 nm-100 μm of a sample, and the actual penetration depth depends on the e-beam energy (voltage) and the material density. Large amounts of energy can be deposited into a surface coating without a drastic effect on the temperature of the underlying substrate. Moreover, E-beam sintering is a cumulative process that occurs gradually with increasing dosage, so one hour's worth of e-beam irradiation can be delivered continuously, or in six ten-minute increments, yielding the same effect. Moreover, there is no heat-up or cool-down time, and with the use of a water-cooled stage, the sample can be maintained at room temperature. For example, in some embodiments, no cooling may be used for the processing metamaterials, and the maximum temperature of the sample may be maintained at or below 150° C. Therefore, in the case of $MgB_2$, the material at atmospheric pressure may be sintered without the evaporation of magnesium.

In still other embodiments, the metamaterial may be produced using a sol-gel technique, and without wishing to be bound by theory, this technique may be used to produce thin films that are substantially optically smooth. Recently, $MgB_2$ nanotubes have been produced using a sol-gel technique, see Nath and Parkinson, Adv. Mater., 18:1865 (2006), using following scheme:

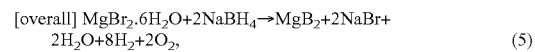

$$[\text{overall}] \; MgBr_2 \cdot 6H_2O + 2NaBH_4 \rightarrow MgB_2 + 2NaBr + 2H_2O + 8H_2 + 2O_2, \quad (5)$$

in which step 1 is the reaction with borohydride, performed in solution:

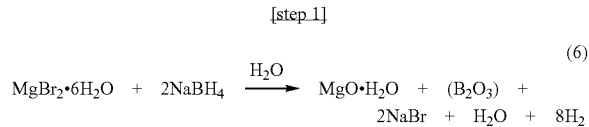

and step 2 is conversion to boride, which occurs in a tube furnace under diborane gas:

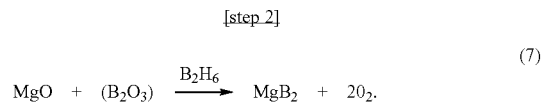

In such embodiments, magnesium bromide or magnesium chloride may be reacted in ethanol with sodium borohydride to from a solution in which an oxide precursor is produced, which forms a gel-like precipitant in the ethanol. Precipitation occurs in the presence of water creating, a smooth gel-like phase may develop. In some embodiments, water may be added to the reaction solution to form a second solution, and in other embodiments, atmospheric water or water vapor may cause precipitation of magnesium dibromide from the second solution. In embodiments in which water is added, the rate of addition may affect the characteristics of the material produced. For example, if water is added more quickly, the texture of the precipitate may be grainier having about 0.1 to about 1 μm particles. Additionally, the addition of water at an early stage may allow for the removal of all or substantially all of the NaBr from the reaction mixture, although borate may also be removed by such addition as well. Precursor solutions of suspensions may be used to make spin cast films with controllable thickness of up to about 1 μm. In some embodiments, precursors may be evolved from solution as a white precipitate.

In some embodiments, the collected precipitate or film may be reacted under an atmosphere of diborane. For example, in certain embodiments, the precipitate may be reacted in a tube furnace under diborane. In such embodiments, diborane, $B_2H_6$, may be generated in situ by dripping a diglyme solution of iodine into $NaBH_4$ and entraining the gaseous products in an argon stream.

Any of the methods described above may further include the step of milling the starting materials, i.e., host material and the nanoparticles, either individually or as a mixture to produce milled powders. In such embodiments, any method for milling may be used. For example, in some embodiments, SiC particles and $MgB_2$ powder may be milled in a dry ball mill using beads, which are harder than $MgB_2$ but not as hard as SiC such as zirconia, to break down the $MgB_2$ particles. In other embodiments, harder beads which can break down both starting materials may be used to mill the starting materials.

In any of the methods described above, embodiments of the methods of the invention may include the steps of suspending and/or precipitating the nanoparticles in a solvent and fractionating the nanoparticles using, for example, gravity or centrifugation. Without wishing to be bound by theory, the size distribution of the nanoparticles can be narrowed slightly using such techniques. However, these steps may be more effective at removing the smallest particles than it is at separating the large and/or irregular nanoparticles.

In some embodiments, commercially available starting materials may be used, and in other embodiments, one or more of the starting materials may be produced in situ. For example, the sol-gel method described above represents an in situ method for producing $MgB_2$. Other methods for producing $MgB_2$ are available in the art and may be incorporated into various embodiments of the invention. In certain embodiments, SiC nanoparticles may be made by carbothermal reduction, that is, $SiO_2$ may be reacted with carbon at high temperatures to produce SiC. Silica microspheres are available down to submicron sizes, with excellent size and shape distribution, which can, in some embodiments, be converted to SiC spheres.

The metamaterials described herein can be used for any purpose generally applicable to metamaterials. For example, in some embodiments, the metamaterials may be used as lenses.

In other embodiments, the metamaterials of embodiments may be used to prepare a spray coatable optical filter. In such embodiments, the matrix material of metal nanoparticles alone in free space or in a polymeric binder that provides the electric response may be used to form a nanocomposite with a random or regular assembly of larger polaritonic nanoparticles such as SiC that supplies a magnetic response. Such materials may be capable of being deposited rapidly over large areas as thin films without vacuum processing and can function as a transmission or reflection filter at visible wavelengths. In other embodiments, these types of materials can be specifically designed for use at ultraviolet, visible, or infrared wavelengths.

In still other embodiments, thin films of the metamaterials of embodiments may be useful in the preparation of negative index materials (NIMs) and may be capable of being used to achieve high-resolution reproductions of features in the near-field, which may be particularly useful for lithographic applications. In such embodiments, the super-resolution phenomena of NIMs can be leveraged, and random structures of particles in a matrix of some embodiments may lend themselves to solution processes such as, for example, spin coating, which may be especially compatible with photolithographic applications.

In yet other embodiments, the metamaterials of embodiments described herein may be tailored to provide a refractive index with positive n values. For example, when a sphere or ball lens has a refractive index equal to two, it focuses light to its back surface, and when that surface is reflective, light is retroreflected, i.e., returned in the same direction from which it came. Spherical retroreflectors are very advantageous to enhance visibility of objects to humans. Thus, in some embodiments, the metamaterials described herein may be used in the preparation of road signs or other instruments that are observed by humans. There are currently few infrared transparent materials that can be used for transmissive optics, and transparent n=2 metamaterials are not readily available.

Figure 24:
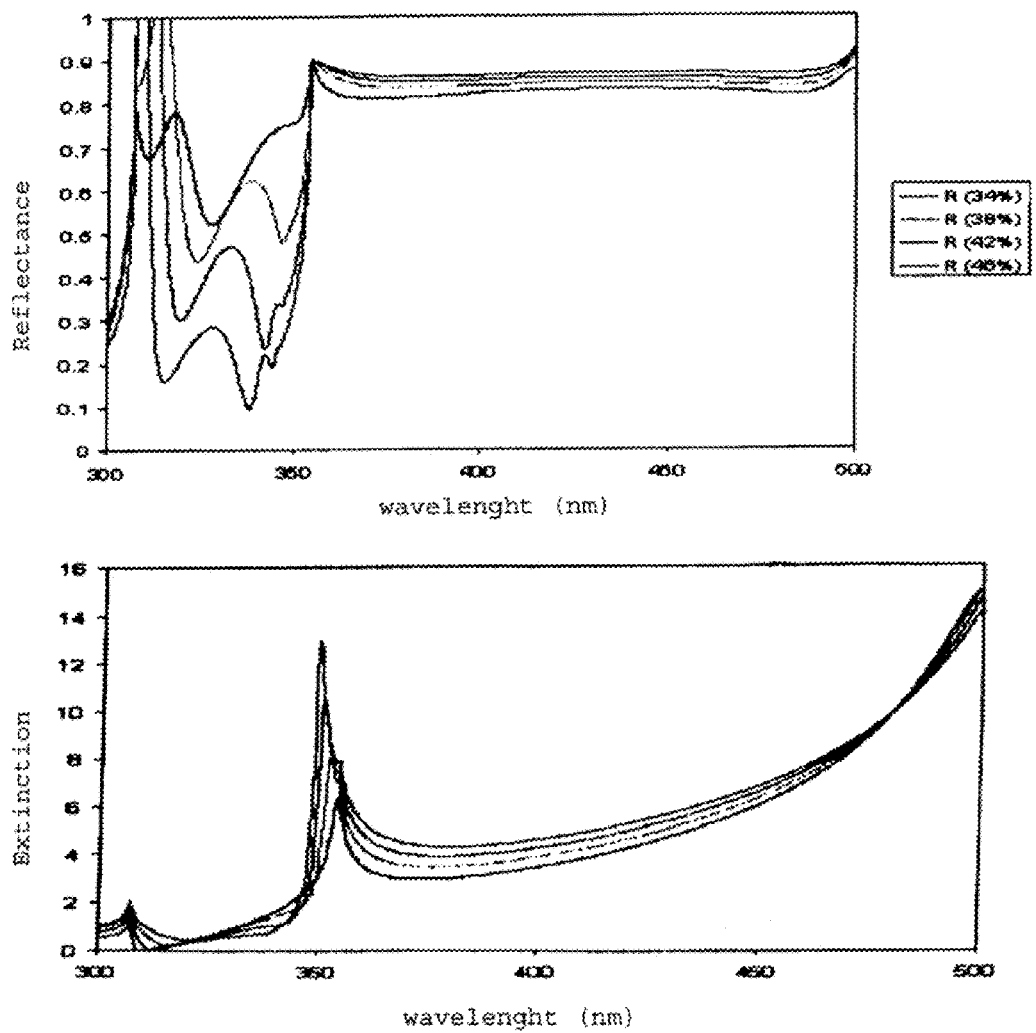
FIG. 24 shows the calculated reflection and extinction spectra for Au/SiC metamaterials where $f_{Au}$ varies from 34% to 46%.

In further embodiments, the metamaterials described herein may be prepared as infrared metamaterials for emissivity control and enhancement of thermophotovoltaic devices where the ability to control the spectral emissivity of a surface can have applications in thermal signature control. For example, the efficiency of thermophotovoltaics can be improved by tuning the thermal emission wavelength to the bandgap of the semiconductor in the photovoltaic (PV) module. In thermophotovoltaics, radiation from a blackbody is absorbed by the PV module, which does not typically absorb the full spectrum of radiation. If the emissivity of the radiator is modified so that the radiation all falls in a narrow band, then it can be absorbed by a single-junction solar cell far more efficiently. In such embodiments, a metamaterial coating such as those described herein can be designed that changes the spectral emissivity of a thermal radiator so that it no longer emits in a broad spectrum, like a blackbody, but instead emits preferentially in the high absorbance bands, such as the extinction bands as shown in FIG. 24. The emissivity can be tuned to the absorption bands of known semiconductors active in the visible and infrared spectrum such as, for example SiC (434 nm), Si (1107 nm), or Ge (1851 nm), and in such embodiments, absorption losses of the metamaterials are not a disadvantage, and robust materials such as borides and carbides may also be used. Theoretical efficiencies of thermovoltaic structures using single-junction solar cells have been estimated at 50% to 60% using metamaterials for emissivity control.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Hot Isostatic Pressing

Pure $MgB_2$

HIP on $MgB_2$ powders was performed in a custom fabricate niobium HIP container having green (i.e., before compression) dimensions of approximately one cubic inch. The 'cans' were fabricated using an Exo TIG inert atmosphere glove box welder facility to get clean ductile welds that survive the demands of high temperature HIP. The can was filled with $MgB_2$ powder (Alfa Aesar) and fully off-gassed with a vacuum to remove adsorbed species on the powder surfaces. The integrity of the filled can was checked with a residual gas analyzer and helium leak detector connected to the pump-off tube, after which it was sealed. The sealed can was placed in a HIP unit and treated at 600° C.

Figure 11:
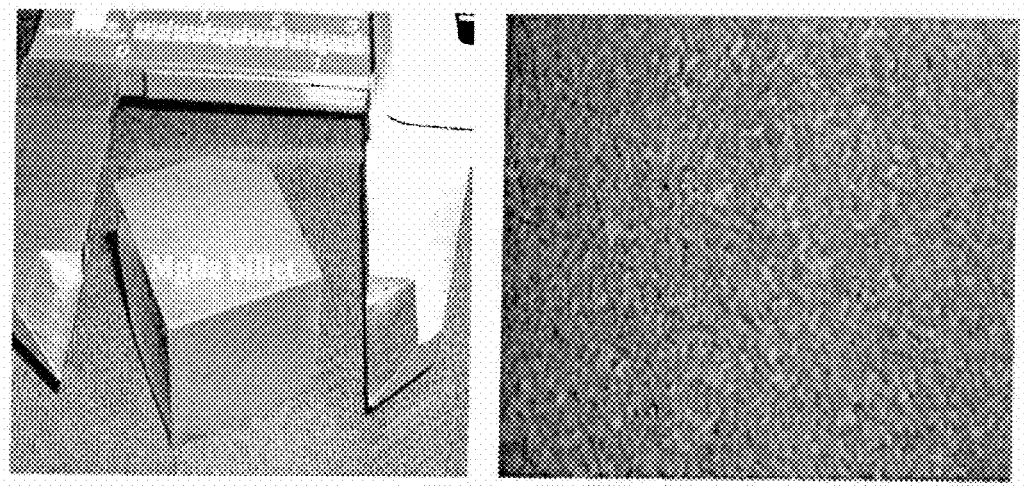
FIG. 11 shows a photograph of a finished billet, and a micrograph (1000× magnification) showing the polycrystalline nature, and also the anisotropic reflectivity of single grains. Feature size is about 1-2 µm.

The completed $MgB_2$ billet is shown in FIG. 11. The $MgB_2$ billet is very hard and robust with a measured density is 2.63 g/cm³, which is close to the theoretical value. It can be cut with a low-speed diamond blade, and samples of about 1 mm were removed for ellipsometric, normal incidence reflection, and surface plasmon resonance measurements. The surface of $MgB_2$ is subject to slow oxidation, which can affect the optical properties over time. The color of $MgB_2$ is either golden or black, depending on the polarization of the incoming light relative to the orientation of the crystal grains as can be seen in the optical micrograph in FIG. 11. The surface of $MgB_2$ can be polished effectively with diamond grit.

Example 2

Hot Isostatic Pressing $MgB_2$/SiC Metamaterials $MgB_2$ (Alfa Aesar) and 30 vol % SiC nominally, 130 nm powder (Nanostructured and Amorphous Materials) or 0.5 μm BF-17 powder (H. C. Starck) were mixed and milled in a ball mill using zirconia beads. The BF-17 powder was first suspended in THF, and the first fraction was removed after 10 minutes for use in the composite. For milling, zirconia beads were used because they are harder than $MgB_2$, but it is not as hard as SiC. Milling for 80 hours produced powders that were no bigger than a half micron in size, and which were very well distributed.

Figure 12:
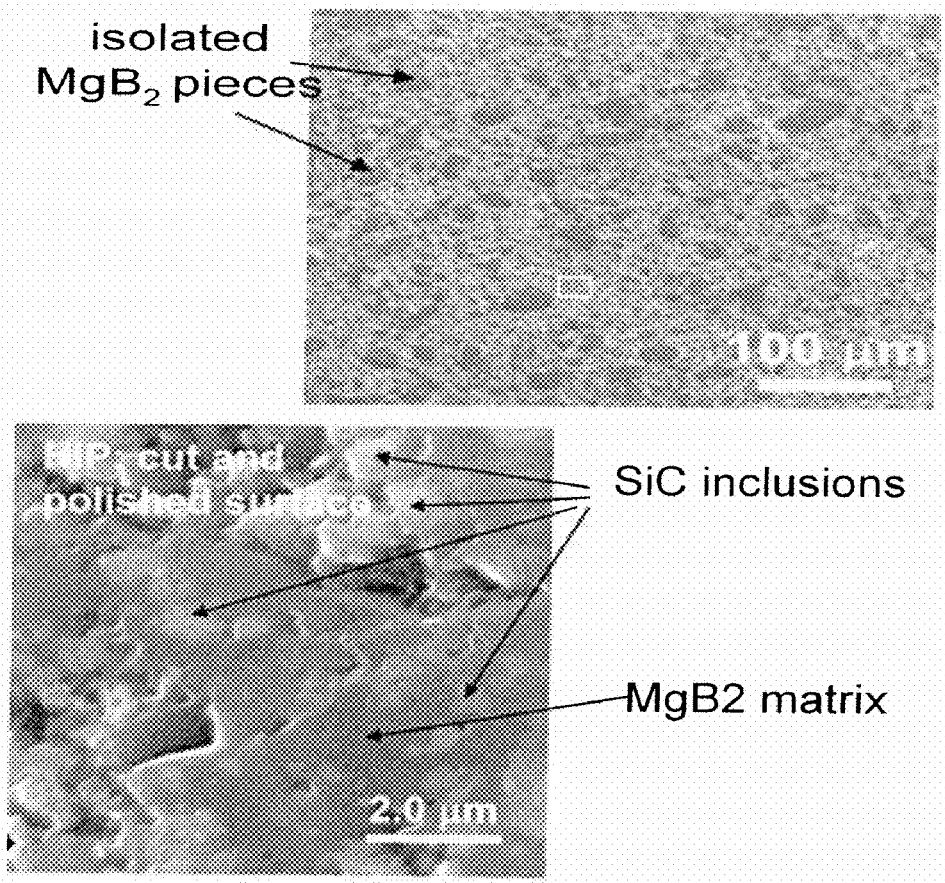
FIG. 12 shows a scanning electron micrograph (SEM) of MgB$_2$/SiC metamaterial prepared using hot isostatic pressing.

These materials were then encapsulated in a metal can and HIPped at a temperature of 700° C. to ensure that the $MgB_2$ consolidated well, but remained well below the sintering temperature of SiC. A thin slice, about 1 mm, was cut from the resulting billets with a diamond blade, and polished with diamond grit as before. SEM images of the polished cross section of the BF-17 composite are shown in FIG. 12. The large inclusions of $MgB_2$ remain in the sample, which probably arise from insufficiently ground starting material. The composition of the large inclusions was verified in the SEM by energy dispersive x-ray (EDX) spectroscopy. However, most of the area is of a composite nature, and higher magnification reveals that in the majority of the material is a continuous $MgB_2$ phase surrounding submicron inclusions of SiC (also verified by EDX), as per the metamaterial design.

Example 3

E-Beam Sintering

Electron beam (e-beam) sintering of composites of $MgB_2$/SiC was accomplished using a technique that delivers small (1 cm2 to large 30×30 cm) sintering to ultra thin (200 nm) to thicknesses of 6.5 microns in ambient conditions. Samples for e-beam sintering were made by milling the nominally 130 nm SiC particles with 325 mesh (about 45 μm) $MgB_2$ powder for 80 h in a dry ball mill. The volume fraction (assuming full density) was 30% SiC. Zirconia beads were used for the milling, which are harder than $MgB_2$ but not as hard as SiC, which were effective in breaking down the boride particles.

To make films, 0.05 g of the powder was mixed with 5 g of acetone in a test tube, and shaken. The fast-settling particles were removed after 30 minutes, and the remaining supernatant, in which the particles were settled out more slowly, was used to cast the films. Silicon chips were placed in 4 mL (a depth of about ⅜") of the remaining suspension and the acetone allowed to slowly evaporate.

Figure 13:
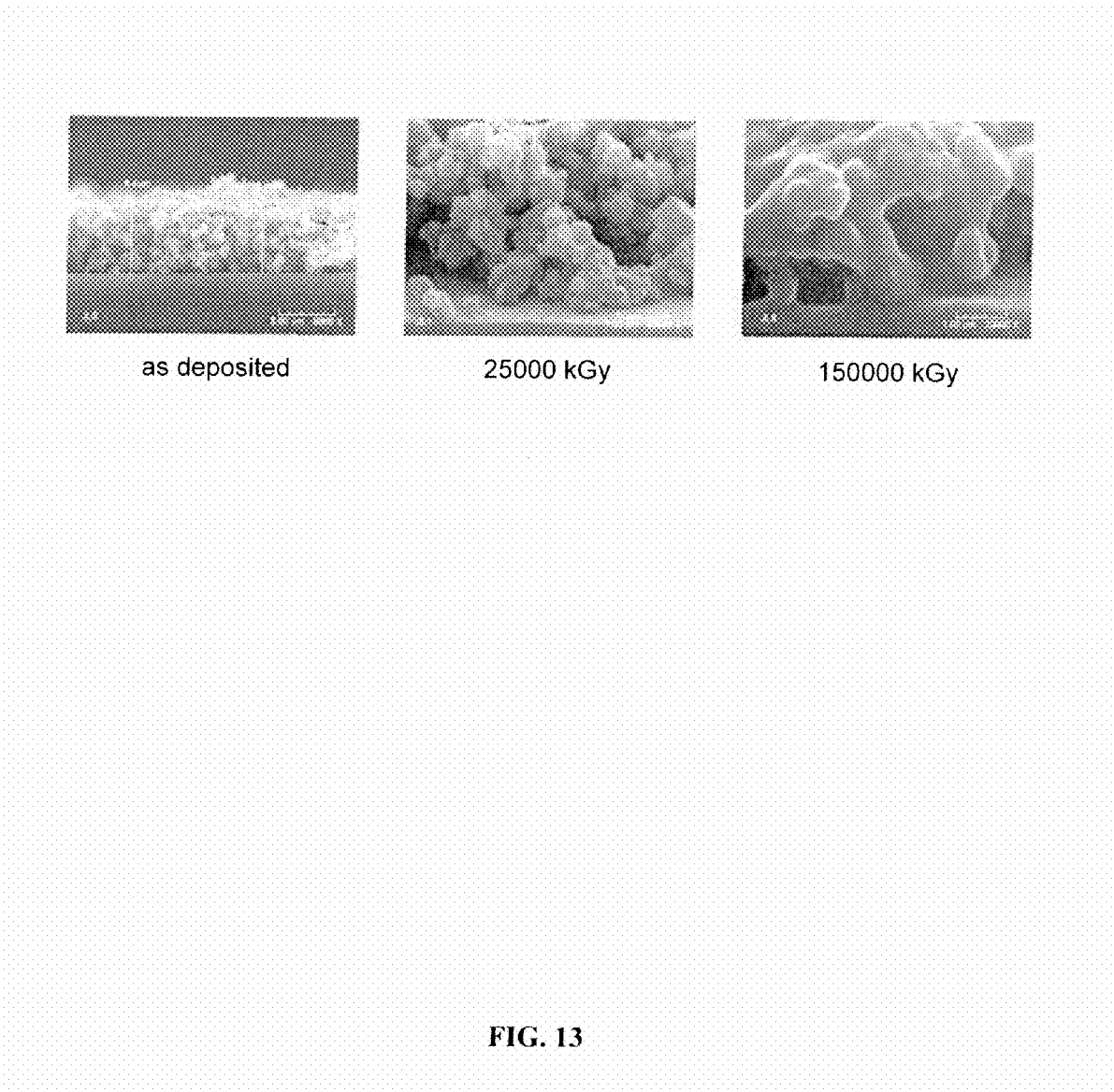
FIG. 13 shows MgB$_2$/SiC films prepared by e-beam sintering. At a dose of 150,000 kGy, the MgB$_2$ appears to be melted around non-aggregated SiC spheres, but the film is not yet fully dense.

The resulting films were 6.5 μm thick. A series of them was then subjected to an e-beam sintering, under a nitrogen atmosphere (<10 ppm oxygen). Samples were removed at dosage intervals of 25,000 kGy, up to 150,000 kGy for the longest sample. The results are shown in FIG. 13. During the course of the experiment, the $MgB_2$ is clearly consolidating, and the remaining identifiable particles (with material melted around them), is likely the $MgB_2$ surrounding the SiC. After a dose of 150,000 kGy, the $MgB_2$ seems completely melted, but not yet completely coalesced.

Example 4

Optical Characterization of $MgB_2$

Ellipsometry

Complimentary ellipsometric measurements were made using a spectroscopic ellipsometer (J. A. Woollam) on the pure $MgB_2$ slab made by HIP and polished using 0.5 μm diamond powder. The surface oxidized only slowly, and scans did not produce different results over the course of at least 30 hours.

Figure 14:
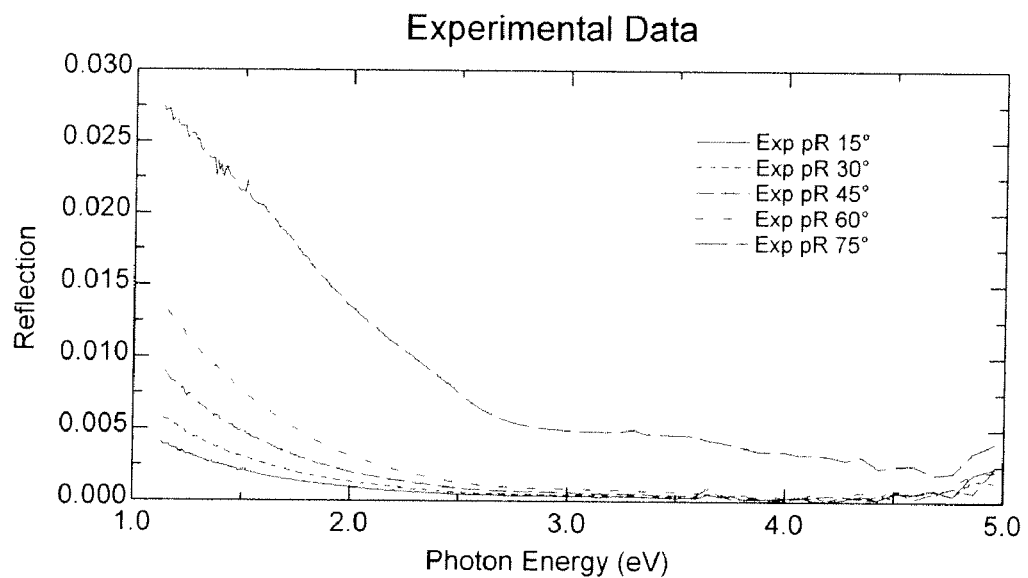
FIG. 14 shows reflectivity curves measured by ellipsometry at different angles. (2 eV=621 nm).
Figure 15:
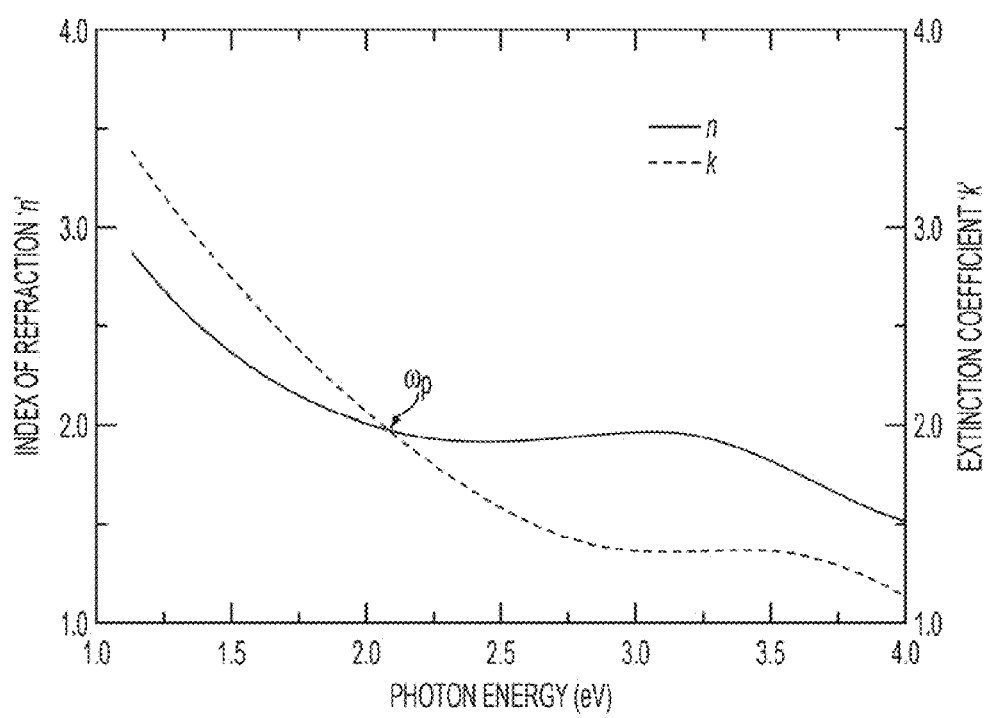
FIG. 15 shows the complex index of refraction derived from the ellipsometric data. The real index is in red, and the imaginary part is the green dashed line. The plasma energy is 2.1 eV, or about 600 nm.

The data is best fit using a 2-term Lorentzian, i.e., one Drude oscillator and one Lorentzian oscillator. Including additional oscillators does not improve the fit. The experimental reflectance curve is shown in FIG. 14, and the complex refractive index (n+ik) is shown in FIG. 15. The plasma energy, visible on the graphs either where n and k cross, is about 600 nm, or 2.1 eV.

Example 5

Optical Characterization of $MgB_2$

Specular Reflection of $MgB_2$

Figure 16:
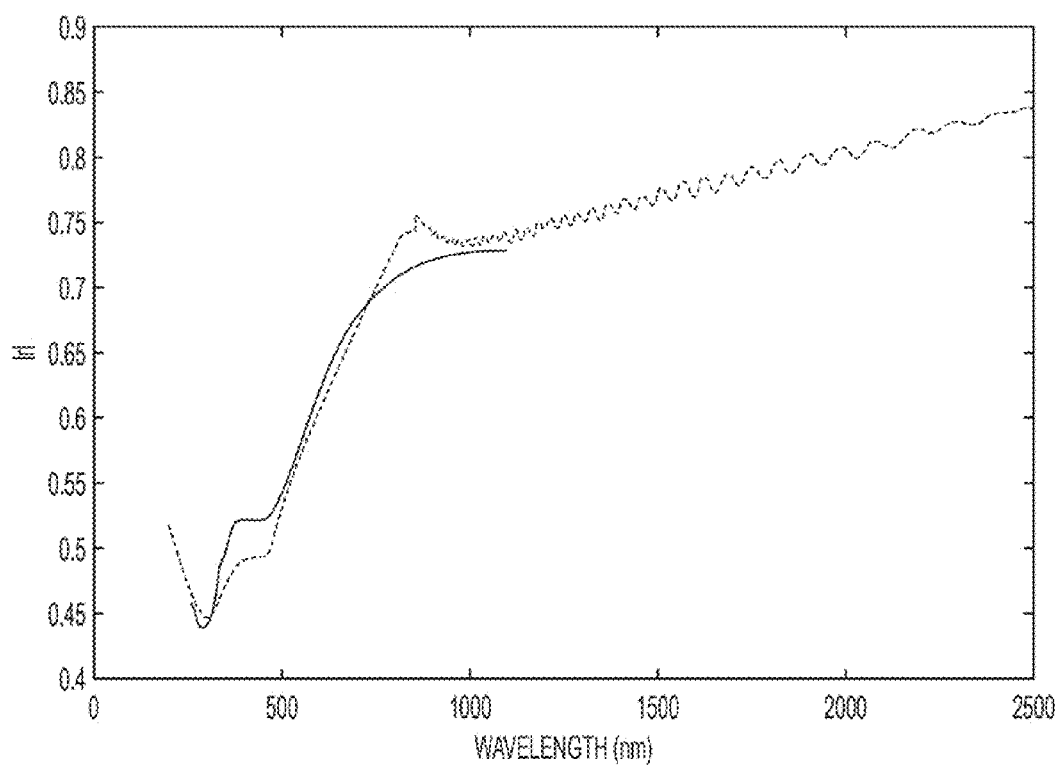
FIG. 16 shows spectrometer normal incidence reflection data (blue line) vs. reflection calculated using ellipsometer data (yellow line).

To verify the results above, these results were compared to normal incidence reflection measurements using a UV-Vis spectrometer fit with a reflection accessory. For comparison, the ellipsometer data was used in an analytic formulation for the normal incidence off a slab and this analytical solution was compared to the experimental data from the spectrometer. As can be seen below in FIG. 16, the blue curve (experimental data) compares very well in its functional form to the data obtained from analytical solutions using the ellipsometer data (yellow line). The reflectance data was shifted by a constant value of 0.3 to account for differences associated with the reference mirror of the spectrometer.

Example 6

Optical Characterization of $MgB_2$

Surface Plasmon Spectroscopy (SPR) and Negative Index Behavior

A test bed for the measurement of surface plasmon resonances in metamaterials by surface plasmon coupling via a measurement of reflection vs. angle, and as a function of polarization was used. Surface plasmons, which are oscillations of free conductors confined to an interface, are excited in a conductor when light impinges on the surface at the correct angle, frequency and polarization. Typically, monochromatic light is directed through a prism, and the intensity of the recovered beam is monitored as a function of angle. Usually, it will reflect from the conductor surface, but at the surface plasmon resonance, energy will be absorbed. In the case of the SPR experiment, this is indicated by a minimum (a "dip") in the curve above the critical angle of the prism.

For a normal conductor, only light polarized in the plane of the surface (p-polarized) can excite a surface plasmon when the permittivity is negative. For s-polarized light, only the magnetic field of the radiation can interact with the light beam, and a surface plasmon can be excited in this case only when the magnetic permeability is negative. For a normal conductor, which has $\in<0$ but $\mu>0$, surface plasmon excitation can only occur with p-polarized light. In a NIM, however, surface plasmons can be excited for both s- and p-polarized light, and dips for both polarizations should be observed. The reflection geometry allows measurement of opaque samples, and validates $\in$ and $\mu$ independently.

Figure 18:
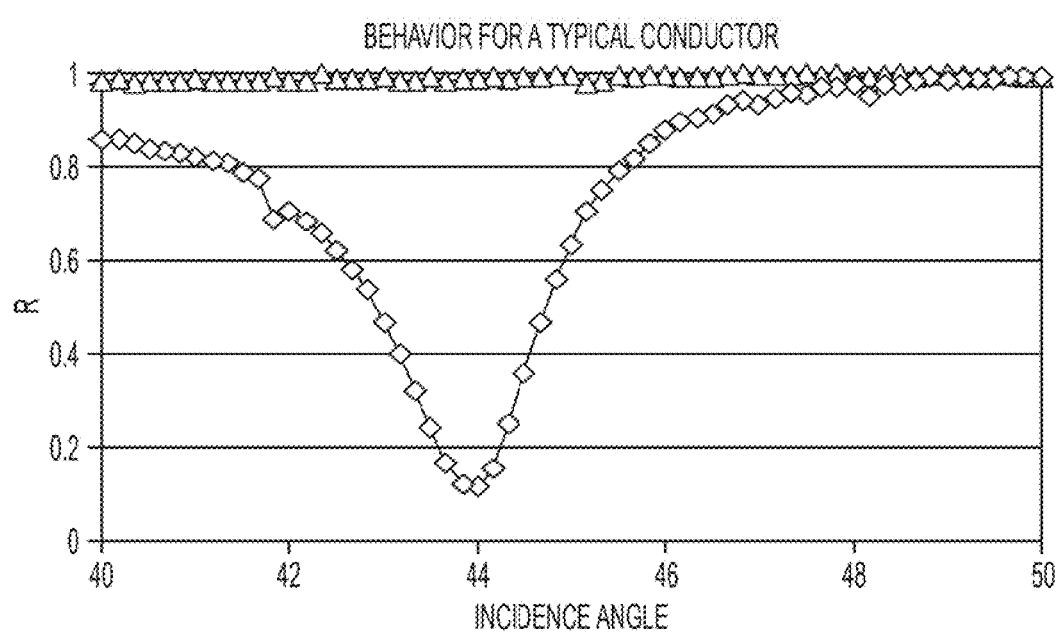
FIG. 18 shows the behavior of a conductor in an SPR experiment. There is no dip for s-polarized light (red curve), but a surface plasmon is absorbed for p-polarized radiation. Here the air gap is zero, and the material is Au on a SiO$_2$ dielectric.

FIG. 17 shows the experimental configuration of the test bed. Experiments were performed in the Otto configuration, where a small air gap exists between the prism and the material under test. This introduces another variable into the analysis, as the shape of the curves will depend on the width of the gap as well as on the material properties. FIG. 18 shows exemplary data from a typical conductor.

Example 7

Optical Characterization of $MgB_2$

SPR

Figure 19:
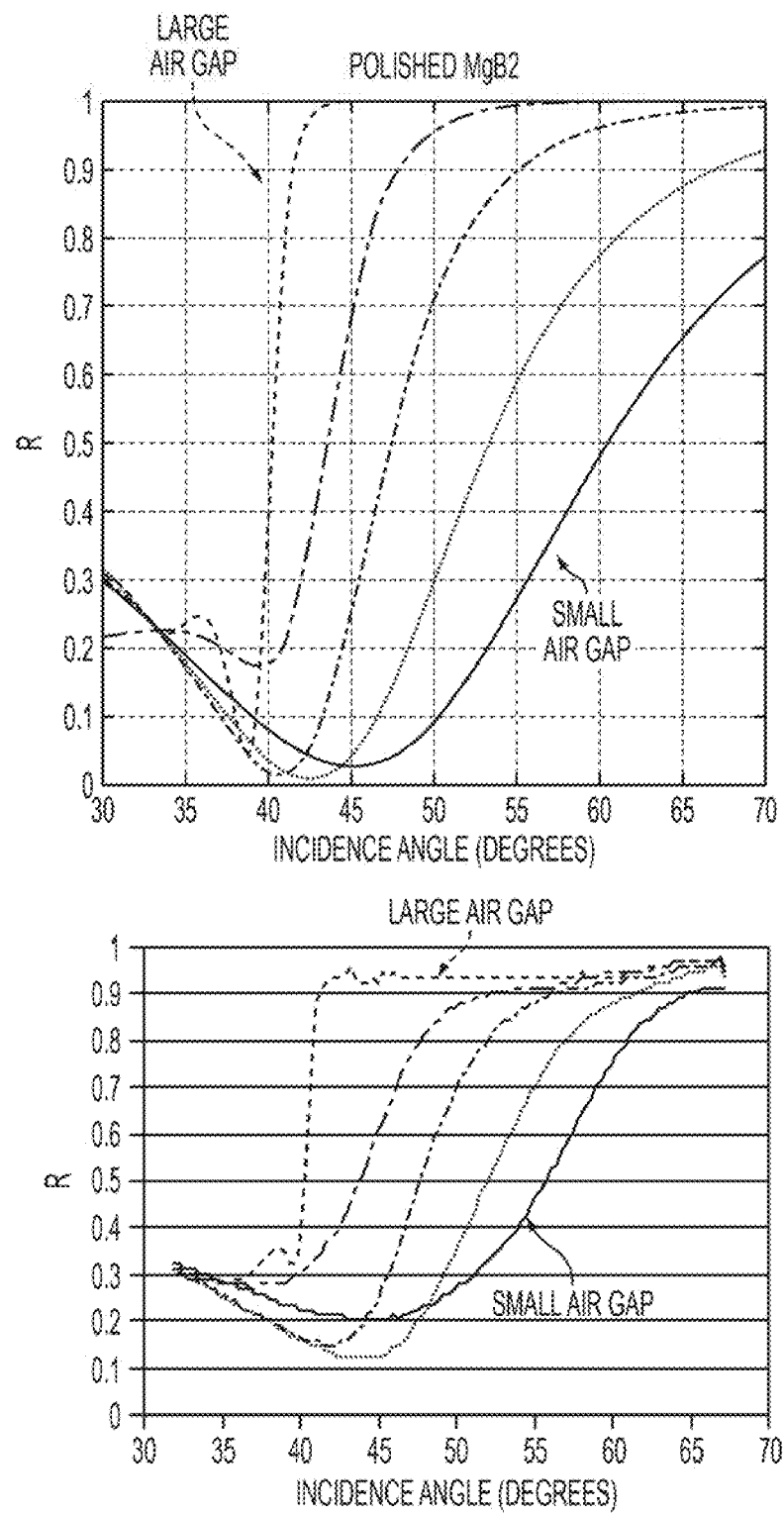
FIG. 19 shows reflection of MgB$_2$ as a function of incident angle and width of air gap in p-polarization.
Figure 20:
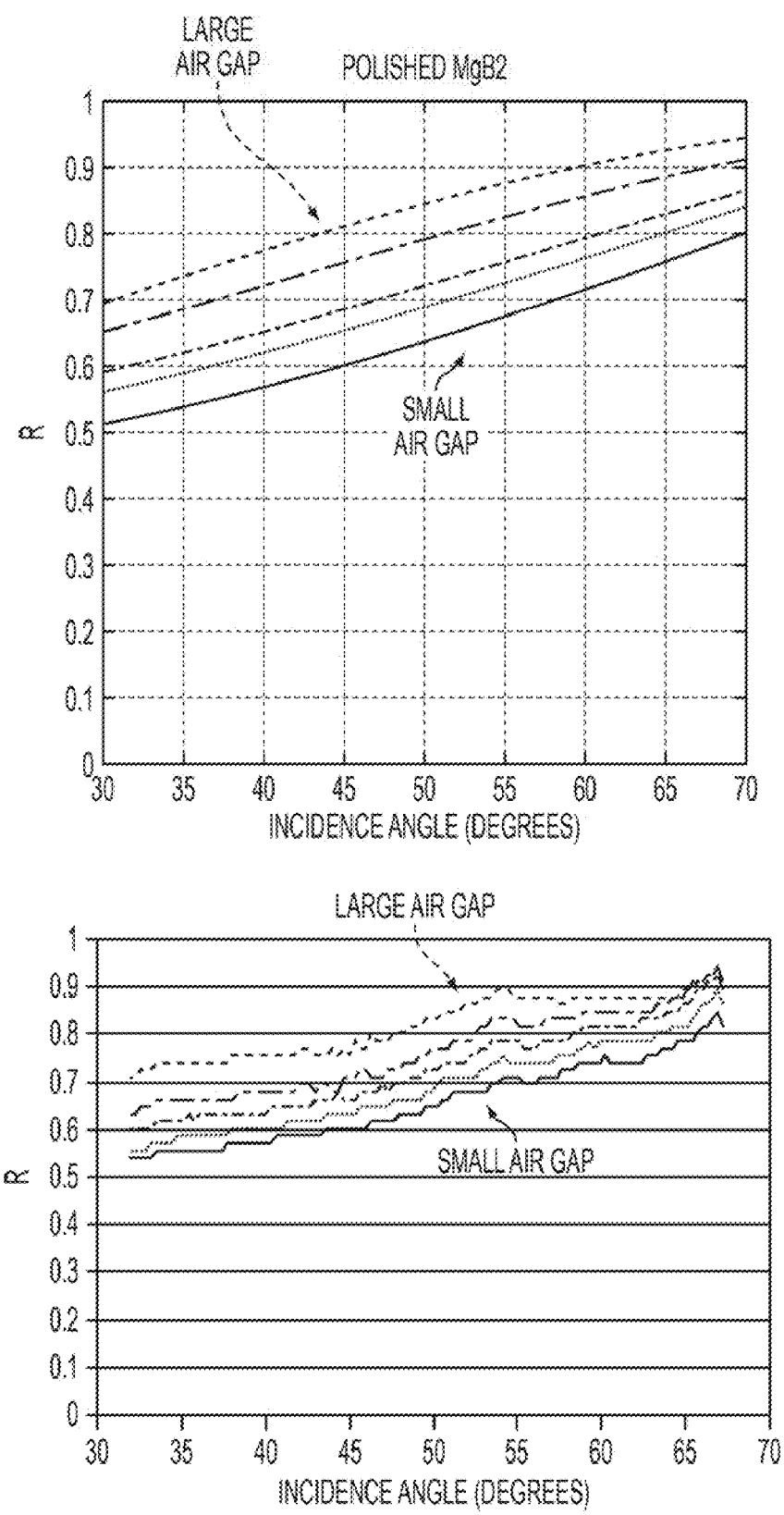
FIG. 20 shows reflection of MgB$_2$ as a function of incident angle and width of air gap in s-polarization.

FIG. 19 and FIG. 20 show the results for $MgB_2$ for varying air gap in both p- and s-polarization using an HeNe laser light source at 632 nm. In both cases, the data match the predicted curves well, and as expected, a dip occurs only in p-polarization. The $MgB_2$ behaves like a negative permittivity material, but still has a positive permeability. For both results, the angle at which the surface plasmon coupling occurs shifts to smaller angles with larger air gaps, which is also predicted in simulations.

Example 8

Optical Characterization of $MgB_2$

SPR Measurements of Negative Refractive Index Behavior

For $MgB_2/SiC$ samples prepared by e-beam sintering and HIP, we expect to see surface plasmon coupling for both p- and s-polarization when the SiC is of the proper size and fill fraction. According to modeling results, the expected size range that will produce NIM behavior will be for particles that are about 500 nm in diameter. Particles with a median diameter of 500 nm were used in composite metamaterials made by HIP.

Figure 21:
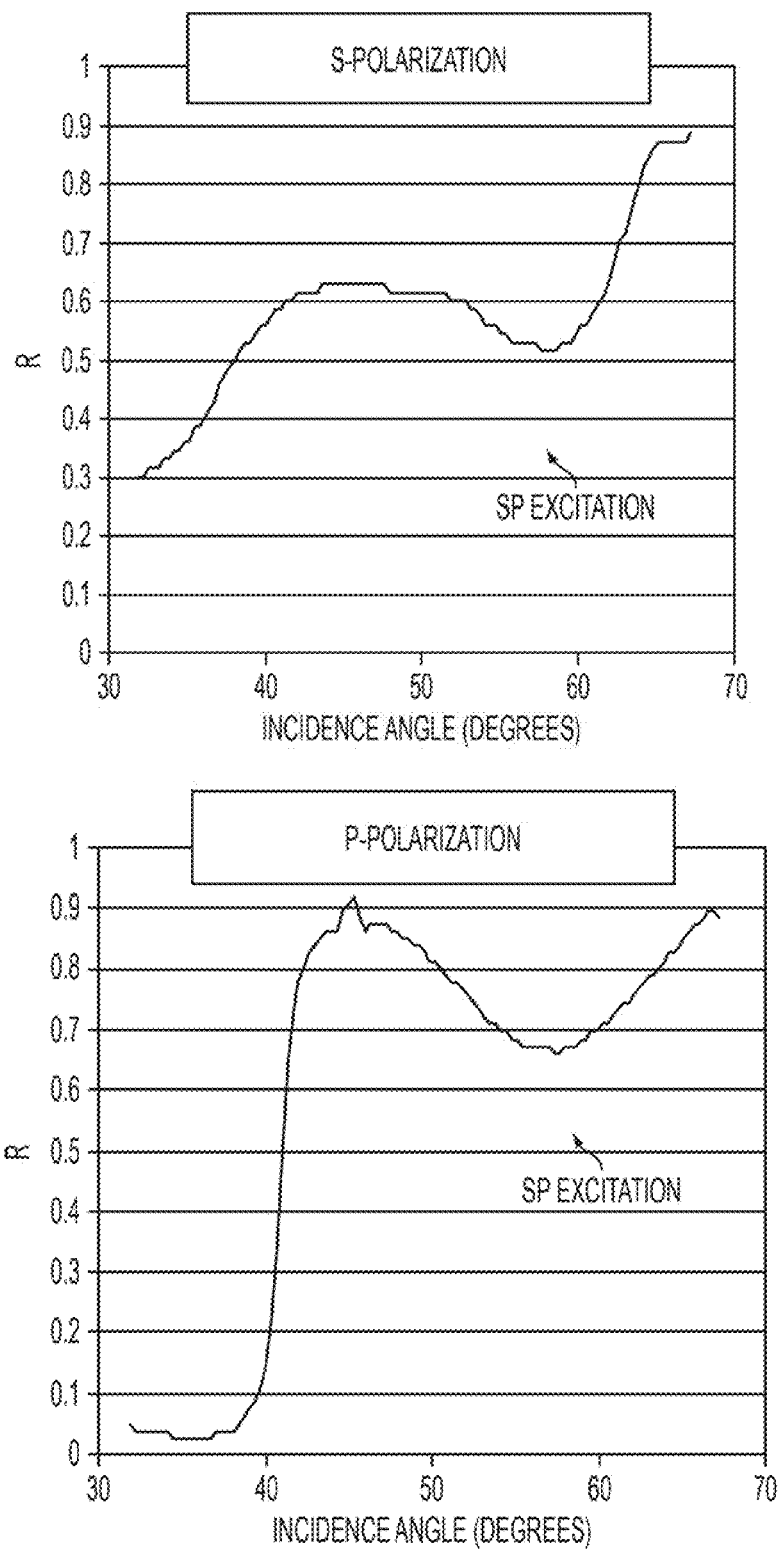
FIG. 21 shows reflection of MgB$_2$/SiC as a function of incident angle, for both polarizations. The sample is made by HIP, using 500 nm diameter SiC particles. Surface plasmons are excited by both s- and p-polarized light, indicative of both $\in$<0 and µ<0, conditions of negative index of refraction.

FIG. 21 shows typical curves taken for these $MgB_2/SiC$ samples. In these cases, there is a clear dip visible for both s- and p-polarizations, indicative of negative values for both $\in$ and $\mu$ and, by inference, a negative index of refraction. Therefore, SEM analysis shows that we have obtained a microstructure close to that which was desired to test the theory, and materials based on random arrangements of spheres can be made for negative index materials in the visible spectrum.

Example 9

$MgB_2/SiC$

Polycrystalline magnesium diboride ($MgB_2$ in a normal state, at room temperature) as the host, providing negative permittivity, and silicon carbide (SiC) nanoparticles embedded randomly within the host, to provide negative permeability was fabricated using hot isostatic pressing to produce a fully dense solid with a well-dispersed SiC nanoparticle phase. The properties of the resulting bulk metamaterial were evaluated using surface plasmon coupling, which showed coupling of both magnetic and electric plasmons, signifying both negative permeability and permittivity at 632 nm. The volume fraction, f, and the radius of the SiC spheres, $r_{SiC}$, were adjusted to make the regions of $\in_{eff}<0$ and $\mu_{eff}<0$ overlap to obtain negative refraction index within the visible region. The main advantages of this design are the intrinsically low electron scattering losses of $MgB_2$ and optical isotropy. Moreover, the random (as opposed to regular) arrangement of SiC enables simpler fabrication approaches.

Figure 22:
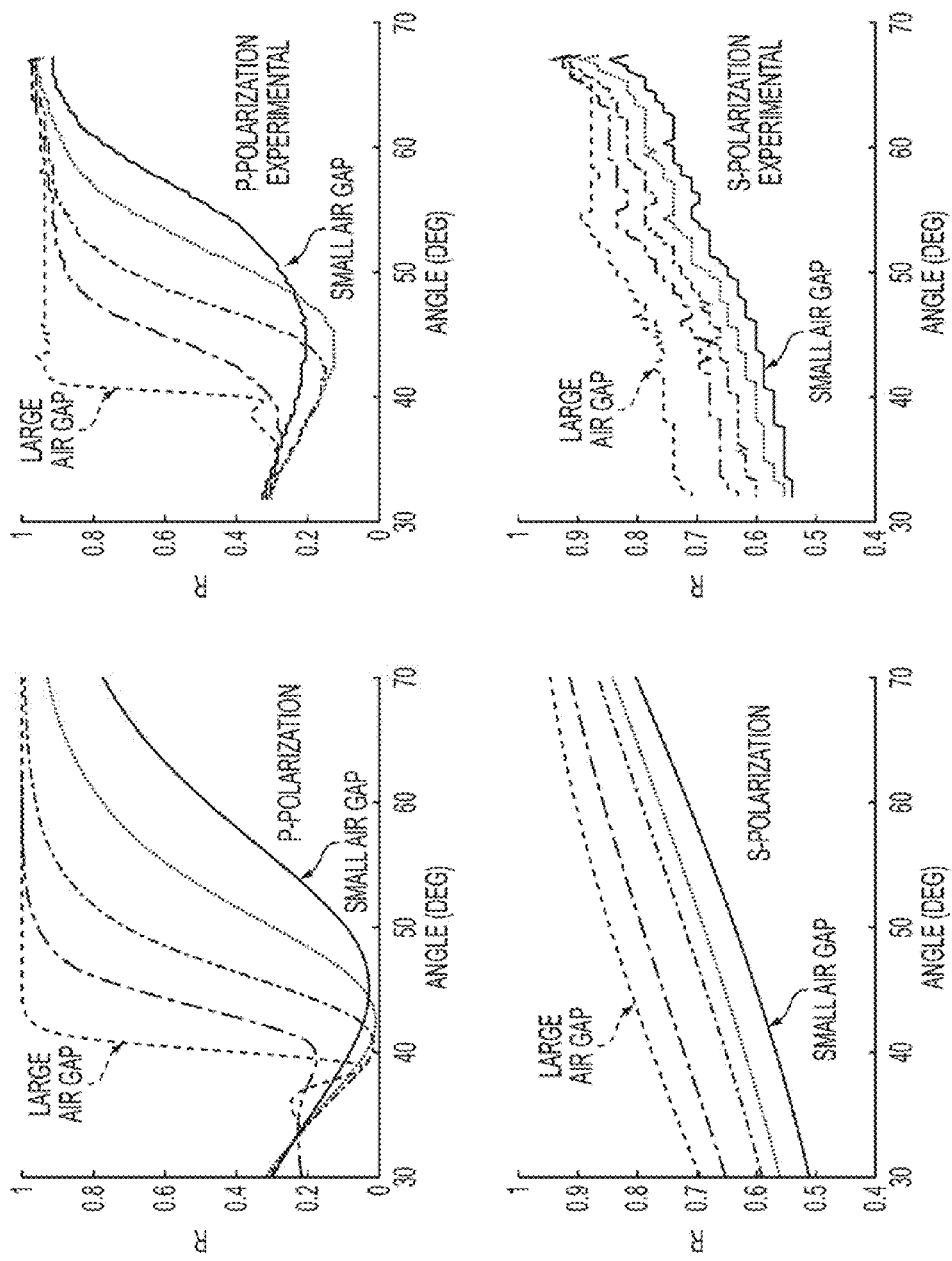
FIG. 22 shows the results of surface plasmon coupling. Coupling is observed for both electric and magnetic plasmons.

The effective permeability appears to be negative at some frequency range due to a Mie resonance associated with the SiC inclusions, and the effective permittivity appears to be negative below the plasma frequency of the $MgB_2$ host material. The SPR results obtained from the $MgB_2/SiC$ sample are shown in FIG. 22 for varying values of the air gap. The experimental and theoretical reflectivity plots show good correlation for both p- and s-polarizations. As expected, for a large air gap, the reflectivity reaches nearly unity above the critical angle. For smaller air gaps, a reflectivity dip occurs above the critical angle for both polarization states at angles of incidence within the 45°-60° degree window, as predicted by the dispersion curves. As this occurs for both polarizations, it indicates both $\in<0$ and $\mu<0$ at this wavelength.

Example 10

Preparation of Au/SiC Material

Figure 23:
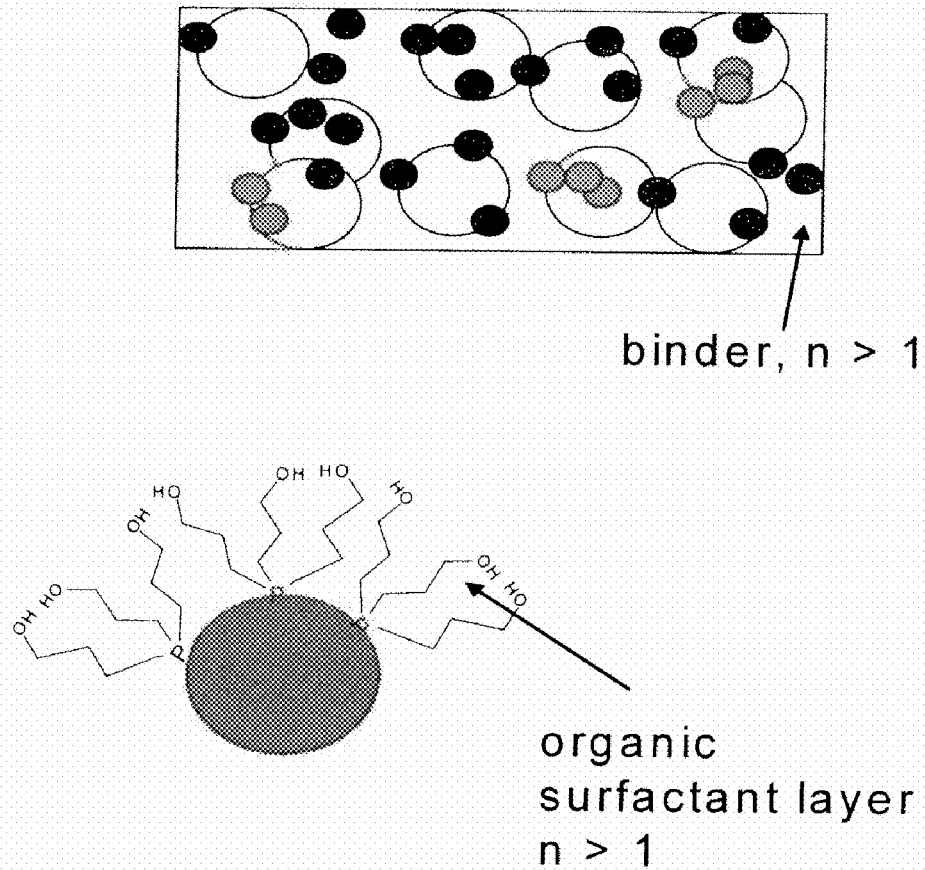
FIG. 23 shows the microstructure of Au/SiC material. For a real material, at the necessary density, the voids will not be free space.

Gold spheres having an average particle size of 13 nm (close to the 10 nm required in the simulation) were prepared using known techniques. These gold particles were functionalized with dodecanethiol in the course of the synthesis, and suspend in nonpolar organic solvents. The volume fraction taken up by particles in the theoretical experiments is 76%, which is very close to the maximum fill factor that can be achieved with randomly packed spheres of this size ratio. In order for these spheres to have a modest chance of remaining separated in a condensed film, a surfactant layer between the spheres is likely to take up most of the remaining volume. This means that the composite won't be Au/SiC/Air, but will contain some organic material between the gold and silicon carbide spheres, as suggested in FIG. 23. Effective medium calculations suggest that this is acceptable, and that negative index will still be observed when the binder has a refractive index greater than 1. (1.2 was the value in the simulation.) The losses increase only modestly.

The dodecanethiol layer on the gold, as well as any surfactant on the SiC and any added binder material take up the 24% of "free space" in the condensed phase. To make films, both materials were suspended in toluene. The SiC was functionalized with Triton X-100 or polycarbonate to make up a volume fraction of 24% relative to all the solids. In some cases it was suspended with no stabilizer, using the volume fraction of solids for Au and SiC for the condensed phase. All suspensions were then sonicated and spin cast onto glass slides to form thin layers or slowly evaporated to form thicker layers. The resulting films, even the one with no stabilizer, were extremely soft, probably resulting from a significant volume fraction of the dodecanethiol compared to the Au or SiC solids. Profilometry measurements were not possible on these soft films.

Example 11

Au/SiC Metamaterial Spray Coatable Optical Filter

An Au and SiC nanoparticles metamaterial can function as a transmission or reflection filter at visible wavelengths, and these types of materials can be specifically designed for ultraviolet, visible, or infrared wavelengths. For modeling, a sample of a mixture of two isotropic dielectric-magnetic media was prepared.

The first host medium included a free space (or dielectric material with known index) doped with small metallic gold spherical inclusions with a radius, $r_{Au}$, and fill factor, $f_{Au}$. The gold particles were 12 nm in diameter, and the volume fractions for gold particles was varied from 34 to 46%. The permittivity of gold particles (with losses) can be described by the extended Drude model. For the small Au particles, the scattering of conduction electrons from the particle surface is not negligible, and the plasmon losses include an experimentally measured mean free path of $\Lambda$~20-30 nm for free electrons in gold due to scattering with photons, and intraband transitions between initial and final states. This is of the same order of magnitude as the radius r of a sphere. Consequently, the standard approach for describing the size dependence of the dielectric function which assumes that the total rate of scattering of conduction electrons is the sum of two rates, i.e. the rate of scattering due to bulk and the rate of scattering due to the surface, was employed.

The guest material is a polaritonic material, spherical particles with radius $R > r_{Au}$ but less than the wavelength of light in the host medium SiC with a permittivity for the SiC material, at optical frequencies, of $\epsilon = 6.7 + 0.01i$. The spherical inclusions were embedded into the host with the fill factor $f_{SiC}$ in two designs either randomly (Maxwell-Garnett model), or as a regular simple-cubic lattice (Lewin's model), and the fraction of 120 nm in diameter SiC spheres in the metamaterial was 30%. Scattering of high permittivity SiC inclusions embedded in the host provides negative effective permeability in a frequency bands that depends on the size and volume fraction of the inclusions.

FIG. 24 shows the effective refractive index dispersion calculated for these materials, and the corresponding transmission and reflection spectra.

Example 12

Tailored-Index (n=2) Metamaterial for MWIR Tagging, Tracking and Locating

Figure 25:
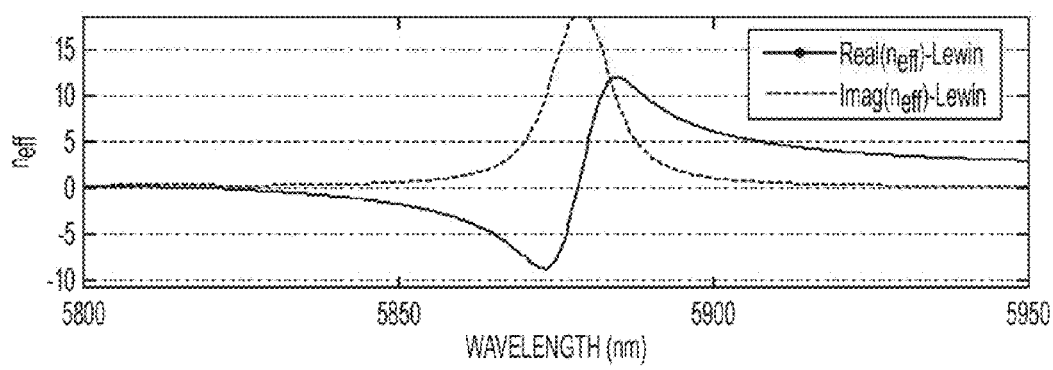
FIG. 25 shows the real and imaginary parts of the refractive index near 6 µm wavelengths.

The composite metamaterials can be designed for MWIR wavelengths, and as demonstrated in Example 22, is capable of producing bulk structures. FIG. 25 shows the calculated refractive index of a gold/SiC metamaterial at the MWIR wavelength of 5950 nm (5.95 µm) which is close to two, and the losses are very low.

Example 13

Ag/SiC Metamaterial for High-Resolution Lithography

For negative index materials (NIMs), thin films have special uses such as being used to achieve high-resolution reproductions of features in the near-field, which may be particularly useful for lithographic applications where the super-resolution phenomena of NIMs can be leveraged. Since these are random structures of particles in a matrix, metal/SiC metamaterials lend themselves to solution processes such as, for example, spin coating, which may be compatible with photolithographic applications.

An isotropic low-loss metamaterial NIM was prepared that can act as a lens at UV wavelengths (193 nm) for use in sub-diffraction-limited high-resolution photolithography. A refractive index of −1 and a resolution of λ/20 may be possible at 193 nm using silver/SiC metamaterial.

Figure 26:
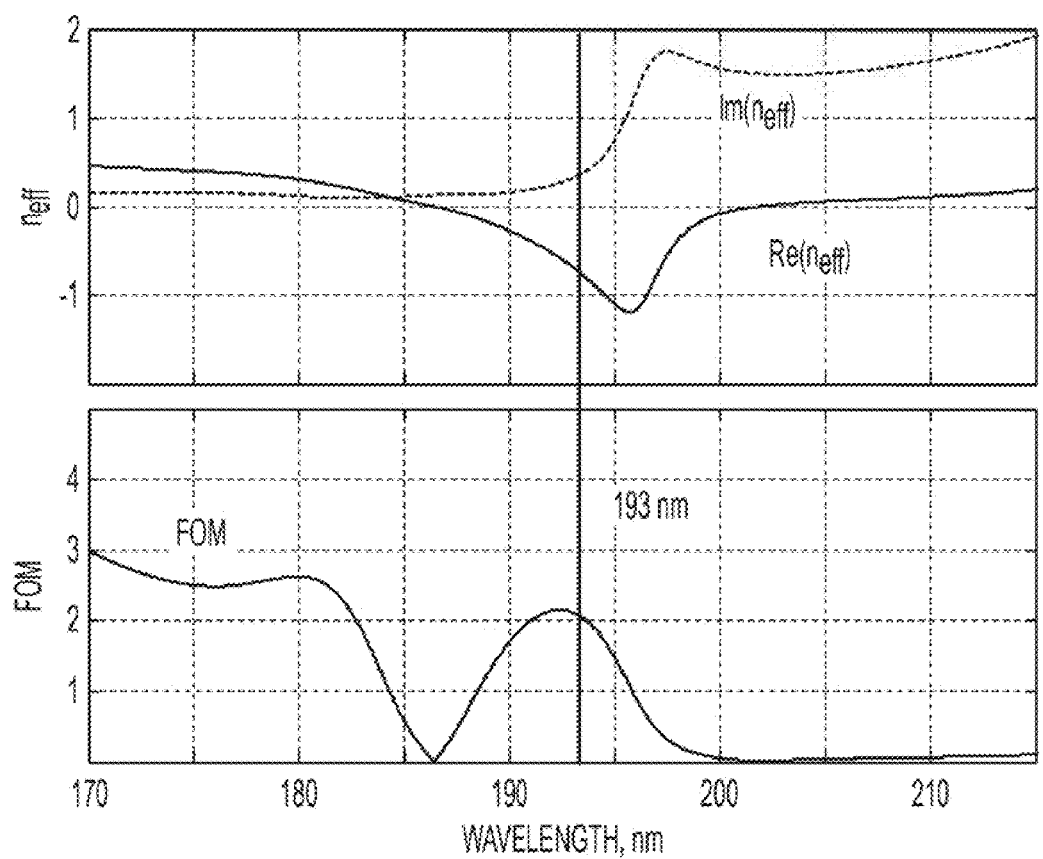
FIG. 26 shows the complex effective refractive index [$n_{eff}$] and figure of merit [FOM=|Re($n_{eff}$)|/Im($n_{eff}$)] for a Ag/SiC metamaterial where $r_{SiC}$=75 nm; $r_{Ag}$=10 nm; $f_{SiC}$=30%; $f_{Ag}$=48%.

FIG. 26 shows the first part of this calculation. For a silver and SiC particles metamaterial, the refractive index can be very close to −1 at 193 nm ($n_{\textit{eff}} = -1$ is index-matched to free space and is an ideal value). In this same region, the imaginary part of the index is close to zero, which implies that the material may be transmissive at least for thin samples. The figure of merit (the magnitude of the real part of the index divided by the imaginary part) is greater than one, which indicates that light propagation through the sample is allowed.

Figure 27:
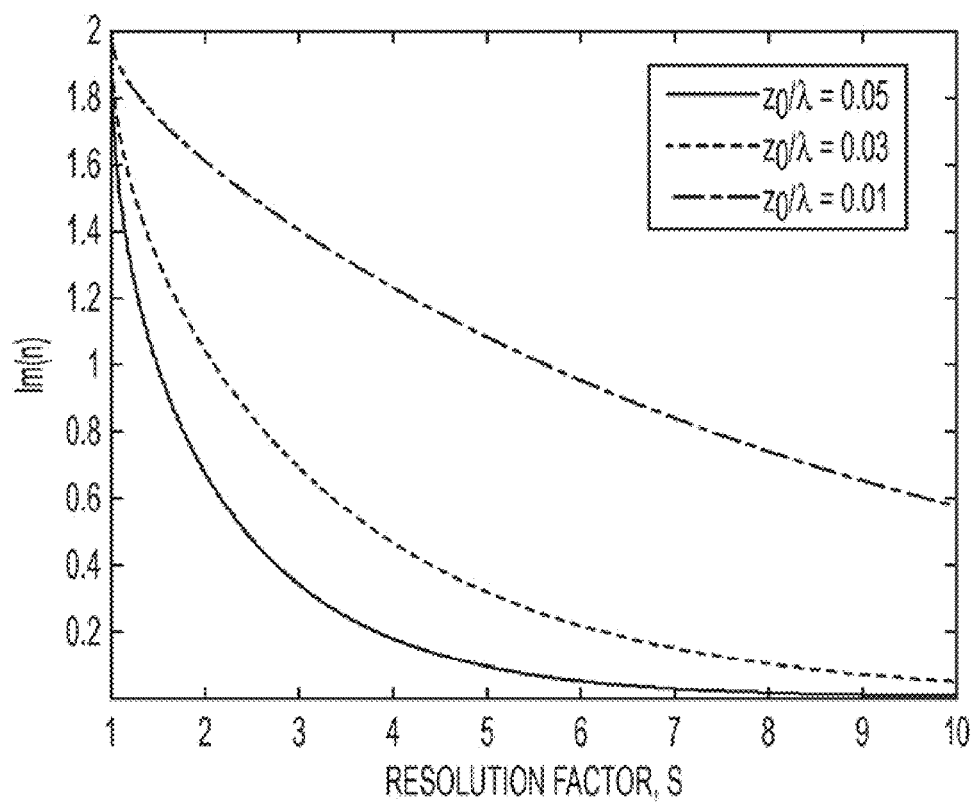
FIG. 27 shows the relationship between image plane distance, resolution factor, and imaginary part of the refractive index at 193 nm where S=10 implies λ/20 resolution.

The second part of the calculation is an analysis of the resolution. Super-resolution can be observed in the near field, which for lithography applications may be feasible, and a photoresist has been used as a medium to measure super-resolution in some laboratories. Published results have documented the resolution enhancement that a $n_{\textit{eff}} = -1$ metamaterial could achieve in an application like this, based on distance, which in these experiments would be controlled by a thin spacer layer of transparent polymer, as well as losses in the metamaterial slab. FIG. 27 shows the resolution that is attainable in these configurations, in terms of the resolution enhancement over a normal diffraction limited (λ/2) optic. For a relatively low-loss material like the one described in FIG. 26 ($\text{Im}(n_{\textit{eff}})$~0.2), λ/20 resolution can be achieved at experimentally feasible spacer thicknesses (>10 nm). Any improvements in the FOM, which will be pursued mathematically and experimentally in this program, will further ease the spacer thickness requirement.

What is claimed is:

1. A method for producing a metamaterial comprising:
   combining a matrix material having a negative permittivity ($\epsilon$) at optical frequencies and nanoparticles having a high dielectric constant structured to cause negative permeability ($\mu$) at optical frequencies due to a scattering resonance to create a powder mixture; and
   sintering at reduced temperature to form a consolidated metamaterial film.

2. The method of claim 1, further comprising the steps of:
   dispersing the powder mixture in a solvent; and
   allowing a film of the powder mixture to form on a substrate before sintering at reduced temperature.

3. The method of claim 2, wherein the solvent is selected from ethanol, methanol, acetone, and any combination of ethanol, methanol, and acetone.

4. The method of claim 2, wherein the substrate is a silicon wafer.

5. The method of claim 1, wherein the consolidated metamaterial film is from about 100 nm to about 100 µm thick.

6. The method of claim 1, wherein the sintering is conducted using an e-beam.

7. The method of claim 1, wherein the sintering comprises a dosage e-beam energy at an interval of from about 25,000 kGy to about 150,000 kGy.

8. The method of claim 1, wherein the reduced temperature is less than about 150° C.

9. The method of claim 1, wherein the sintering occurs under nitrogen.

10. The method of claim 1, further comprising milling a matrix material and nanoparticles to produce a milled powder.

11. The method of claim 1, wherein the matrix material is polycrystalline magnesium diboride ($MgB_2$).

12. The method of claim 1, wherein the matrix material comprises nanoparticles of material selected from gold (Au), platinum (Pt), copper (Cu), silver (Ag), nickel (Ni), palladium (Pd), cadmium (Cd), zinc (Zn), and combinations thereof.

13. The method of claim 1, wherein the nanoparticles are selected from titanium oxide ($TiO_2$), zirconium oxide ($ZrO_2$), and combinations thereof.

14. The method of claim 1, wherein the nanoparticles are silicon carbide (SiC) nanoparticles.

15. The method of claim 1, wherein the nanoparticles comprise from about 10% by volume to about 50% by volume of the metamaterial.

16. A method for producing a metamaterial comprising:
    dispersing a magnesium salt in organic solvent and reacting with a borohydride compound to form a solution;
    adding water to the solution to form a second solution;
    precipitating magnesium diboride from the second solution;
    collecting the precipitate; and
    reacting under an atmosphere of diborane.

17. The method of claim 16, wherein the magnesium salt is magnesium chloride or magnesium boride.

18. The method of claim 16, wherein the borohydride is sodium borohydride.

19. The method of claim 16, further comprising spin casting the precipitate.

20. The method of claim 16, further comprising reacting the precipitate under an atmosphere of diborane.

21. A method for producing a metamaterial comprising:
    combining a matrix material having a negative permittivity ($\epsilon$) at optical frequencies and nanoparticles having a high dielectric constant structured to cause negative permeability ($\mu$) at optical frequencies due to a scattering resonance to create a powder mixture;
    encapsulating the powder mixture in a container; and
    consolidating the powder mixture by hot isostatic pressing to form a metamaterial billet.

22. The method of claim 21, further comprising cutting metamaterial billet.

23. The method of claim 21, wherein the hot isostatic pressing is carried out at from about 600° C. to about 700° C.

24. The method of claim 21, wherein the matrix material is polycrystalline magnesium diboride ($MgB_2$).

25. The method of claim 21, wherein the matrix material comprises nanoparticles of material selected from gold (Au), platinum (Pt), copper (Cu), silver (Ag), nickel (Ni), palladium (Pd), cadmium (Cd), zinc (Zn), and combinations thereof.

26. The method of claim 21, wherein the nanoparticles are selected from, titanium oxide ($TiO_2$), zirconium oxide ($ZrO_2$), and combinations thereof.

27. The method of claim 21, wherein the nanoparticles are silicon carbide (SiC) nanoparticles.

28. The method of claim 21, wherein the nanoparticles comprise from about 10% by volume to about 50% by volume of the metamaterial.

* * * * *